(12) United States Patent
Ji et al.

(10) Patent No.: US 11,706,193 B2
(45) Date of Patent: Jul. 18, 2023

(54) INTELLIGENT FLOW STATE SYNCHRONIZATION TO IMPROVE RESILIENCY, AVAILABILITY, AND/OR PERFORMANCE OF REDUNDANT NETWORK SECURITY DEVICES

(71) Applicant: Juniper Networks, Inc., Sunnyvale, CA (US)

(72) Inventors: Weimin Ji, San Jose, CA (US); John E. Drake, Pittsburgh, PA (US); Jeffrey M. Haas, Ypsilanti, MI (US)

(73) Assignee: Juniper Networks, Inc., Sunnyvale, CA (US)

( * ) Notice: Subject to any disclaimer, the term of this patent is extended or adjusted under 35 U.S.C. 154(b) by 143 days.

(21) Appl. No.: 17/397,848

(22) Filed: Aug. 9, 2021

(65) Prior Publication Data

US 2023/0037516 A1    Feb. 9, 2023

(51) Int. Cl.
*G06F 9/00*       (2006.01)
*G06F 15/16*      (2006.01)
*G06F 17/00*      (2019.01)
*H04L 9/40*       (2022.01)
*H04L 41/0668*    (2022.01)

(52) U.S. Cl.
CPC ...... *H04L 63/0209* (2013.01); *H04L 41/0668* (2013.01)

(58) Field of Classification Search
CPC ............. H04L 63/0209; H04L 63/0668; H04L 41/0668
USPC .......................................................... 726/11
See application file for complete search history.

(56) References Cited

U.S. PATENT DOCUMENTS

| 2016/0269439 | A1* | 9/2016 | Ho ........................... H04L 47/33 |
| 2018/0270199 | A1* | 9/2018 | Banerjee ................. H04L 45/02 |
| 2022/0231947 | A1* | 7/2022 | Krayden ................. H04L 69/22 |

FOREIGN PATENT DOCUMENTS

AU    2016277754 A1    2/2017

OTHER PUBLICATIONS

D. Karger, E. Lehman, T. Leighton, M. Levine, D. Lewin, R. Panigrahy, "Consistent Hashing and Random Trees: Distributed Caching Protocols for Relieving Hot Spots on the World Wide Web," *Proceedings of the Twenty-Ninth Annual ACM Symposium on Theory of Computing* (ACM STOC 10.1145/25833.258660, Feb. 8, 2001).

(Continued)

*Primary Examiner* — Jeffrey C Pwu
*Assistant Examiner* — Samuel Ambaye
(74) *Attorney, Agent, or Firm* — John C. Pokotylo; Pokotylo Patent Services

(57) ABSTRACT

Example security systems for use between at least one upstream router and at least one downstream router, are described. A group or pool of security devices can be used to provide stateful security to bidirectional packet flows between upstream and downstream routers. The packets of the bidirectional flows are forwarded to particular security devices based on a consistent hash ring process. For a given flow, bidirectional state information is synchronized among some, but not all, of the security devices. The security devices among which such bidirectional flow state information is shared are determined using the same consistent hash ring process.

20 Claims, 16 Drawing Sheets

(56) References Cited

OTHER PUBLICATIONS

D. Karger, E. Lehman, T. Leighton, M. Levine, D. Lewin, R. Panigrahy, "Consistent Hashing: Load Balancing in a Changing World" (Jul. 1, 1997) downloaded from https://people.csail.mit.edu/karger/Talks/Hash/index.htm on Aug. 9, 2021.
Extended European Search Report to corresponding European Patent Application No. 21205824.2-1213, dated Mar. 31, 2022 (10 pgs.).

* cited by examiner

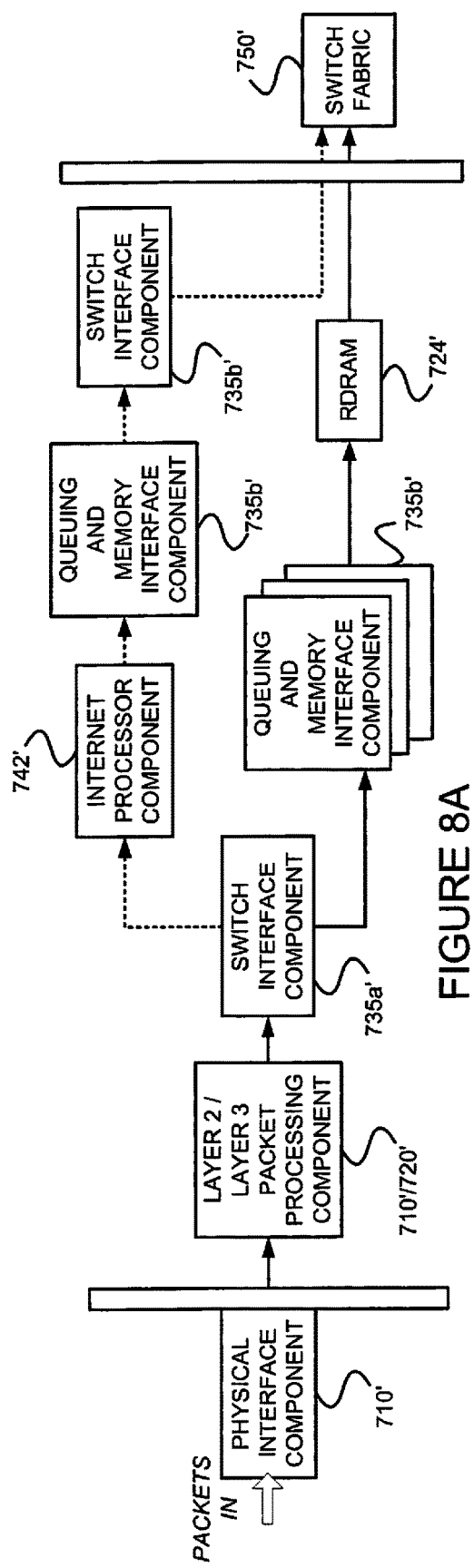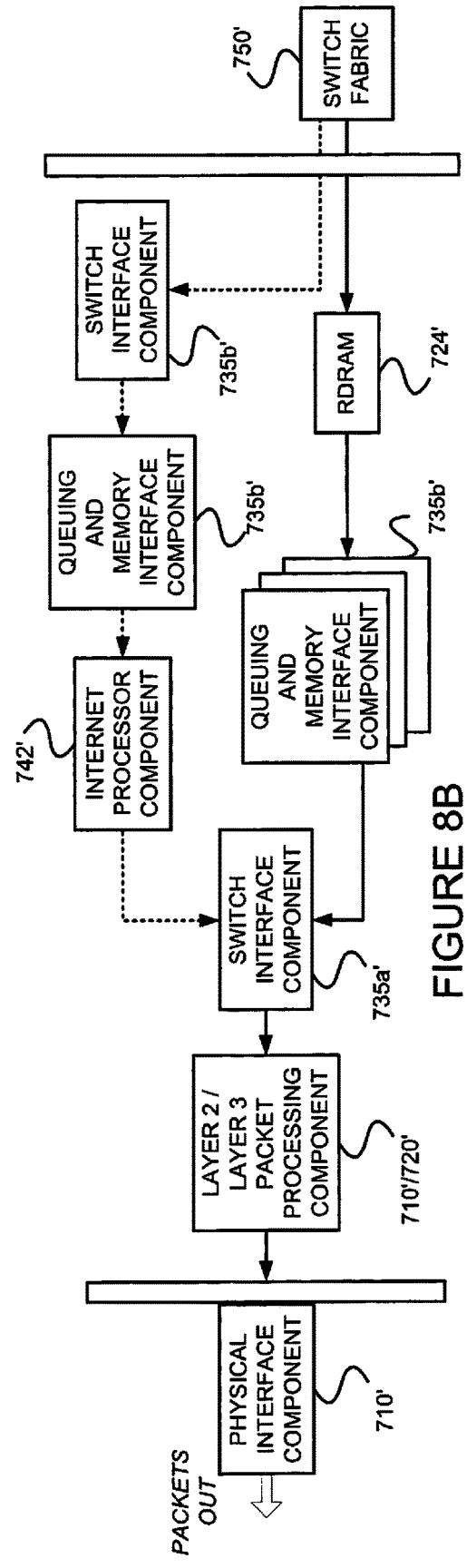

INTELLIGENT FLOW STATE SYNCHRONIZATION TO IMPROVE RESILIENCY, AVAILABILITY, AND/OR PERFORMANCE OF REDUNDANT NETWORK SECURITY DEVICES

§ 1. BACKGROUND OF THE INVENTION

§ 1.1 Field of the Invention

The present description concerns communications networks and security. More specifically, the present description concerns providing security to communications networks.

§ 1.2. Background Information

Current network security devices often provide various stateful network security services (e.g., layer 3 to layer 7 (L3 to L7)) by processing received Internet protocol (IP) packets. They are used to monitor network traffic and classify it as either legitimate or suspicious. Suspicious traffic may be dropped, and/or blocked, and/or have other security processing applied. In a typical L3 network topology, security devices connect to neighbor routers via dynamic routing protocols, e.g., BGP.

To increase resiliency, availability, and performance of network security service, it is desirable to group multiple security devices together so that one or more backup security devices can provide redundancy in case a primary security device fails or goes down (e.g., restarts) for some reason. It might also be desirable for multiple security devices to share the workload of providing security services by operating in parallel.

FIG. 1 illustrates an example network topology 100 in which a pool or group of N security devices (SDs) 110 provide security for upstream routers 120 (e.g., R1 and R2, connected to, or a part of, public network 125) and downstream routers 130 (e.g., R3 and R4, connected to, or a part of, internal network 135). The security devices, upstream routers, and/or downstream routers may share control information via a protocol such as the Border Gateway Protocol (BGP) 130. Each of the upstream routers 120 may use equal cost multipath (ECMP) 140 to provide forwarding to the pool of security devices 110. For example, routers implement packet-based forwarding. In selecting an ECMP next hop, routers can use various different algorithms. One such algorithm is a hash algorithm whose input or key includes information extracted from the header of IP packets (e.g., the source IP address and/or destination IP address). Similarly, each of the downstream routers 130 may use ECMP 150 to provide forwarding to the pool of security devices 110.

Conceptually, this strategy of providing a pool of security device looks promising. Unfortunately, however, it has a scaling problem when the number of redundant security devices becomes large (assuming "stateful" security is to be provided). The scaling problem stems from a need for flow state synchronization among security devices if these security devices are to provide stateful security. More specifically, routers typically treat redundant security devices as ECMP next hops. That is, routers typically map an IP packet to a security device using an ECMP path selection algorithm (e.g., using a hash function provided with the packet's IP address as an input). Using the mapping result, routers select a security device as next hop for the IP packet and send it to the selected security device.

In practice, security device may go out of service (e.g., go "DOWN") and recover later (e.g., come "UP"). The potential change of security device when one goes DOWN will cause routers to alter the mapping between flows of IP packets and their next hops of security devices. Without knowledge about the result of this kind of mapping change by upstream and/or downstream routers, a security device in the group will assume a worst case scenario in which the mapping will be changed randomly. Consequently, under this worst case assumption, each security device will need to be backed up by any and all of its peer devices. That is, each security device will, under this worst case assumption, synchronize its flow state information with all peer security devices in the group. This amount of synchronization of flow state information will cause a security device to spend excessive bandwidth to send (and receive) states to every peer security device and allocate a huge amount of memory to store copies of states received from all peer security devices in the group, especially as N becomes large. This problem makes it technically and economically impracticable to scale up the number of redundant security devices.

In view of the foregoing, it would be useful to provide security services with high resiliency, availability and performance. It would be useful to provide this with many redundant security devices, while avoiding scaling problems.

Some security devices apply bidirectional rules, and therefore track information about data traffic in both upstream and downstream direction. Therefore, it would be useful to provide stateful, bidirectional, security.

§ 2. SUMMARY OF THE INVENTION

Example embodiments consistent with the present description solve the challenge of providing many redundant security devices, while avoiding scaling problems. Example embodiments consistent with the present description may do so by forwarding the packets of bidirectional flows to particular security devices based on a consistent hash ring process. For a given flow, bidirectional state information is synchronized among some, but not all, of the security devices. The security devices among which such bidirectional flow state information is shared are determined using the same consistent hash ring process.

In one example embodiment, a security system is provided for use between at least one upstream router and at least one downstream router. Such a security system includes a first plurality (N) of security devices arranged between the at least one upstream router and the at least one downstream router, each of the first plurality of security devices being configured to provide bidirectional security services for a plurality of bidirectional flows between the at least one upstream router and the at least one downstream router. For each of the plurality of bidirectional flows, (1) one of the first plurality of security devices is assigned, as a primary security device to the bidirectional flow, using a consistent hash ring algorithm for generating a consistent hash ring, and (2) a set (M, where M is at least 1) of one or more of the first plurality of security devices is assigned, as backup security device(s) to the bidirectional flow, using the consistent hash ring algorithm, wherein M+1 is less than N. Each of the first plurality of security devices is configured with a state synchronization process in which, for each of the plurality of bidirectional flows, the primary security device assigned to the bidirectional flow and set of M backup security device(s) assigned to the bidirectional flow, synchronize bidirectional flow state information with one another, but do not synchronize bidirectional flow state information with all of the N security devices.

In some such security systems, for each of the plurality of flows, the primary security device assigned to the bidirectional flow and set of M backup security device(s) assigned to the bidirectional flow, synchronize the bidirectional flow state information only with one another, but not with any other one of the N security devices.

In some such security systems, for each of the plurality of bidirectional flows, the M backup security device(s) assigned to the bidirectional flow are the M next unique security device(s) following (e.g., in a clockwise direction), on the consistent hash ring, the primary security device assigned to the bidirectional flow.

In some such security systems, upon failure of a primary security device assigned to a given bidirectional flow, the at least one upstream router and the at least one downstream router forward any packets belonging to the given bidirectional flow to a next available (e.g., UP) one of the M backup security device(s) assigned to the given bidirectional flow on the consistent hash ring. In some such security systems, upon recovery of the primary security device assigned to the given bidirectional flow, responsive to the recovery, the at least one upstream router and the at least one downstream router forward any packets belonging to the given bidirectional flow to the primary security device assigned to the given bidirectional flow.

In some such security systems, if M is more than 1, upon failure of both (1) a primary security device assigned to a given bidirectional flow and (2) a next one of the M backup security device(s) on the consistent hash ring assigned to the given bidirectional flow, the at least one upstream router and the at least one downstream router forward any packets belonging to the given bidirectional flow to a next available one of the M backup security device(s) assigned to the given bidirectional flow on the consistent hash ring.

§ 3. BRIEF DESCRIPTION OF THE DRAWINGS

FIGS. 8A and 8B is an example of operations of the example architecture of FIG. 7.

§ 4. DETAILED DESCRIPTION

Figure 1:
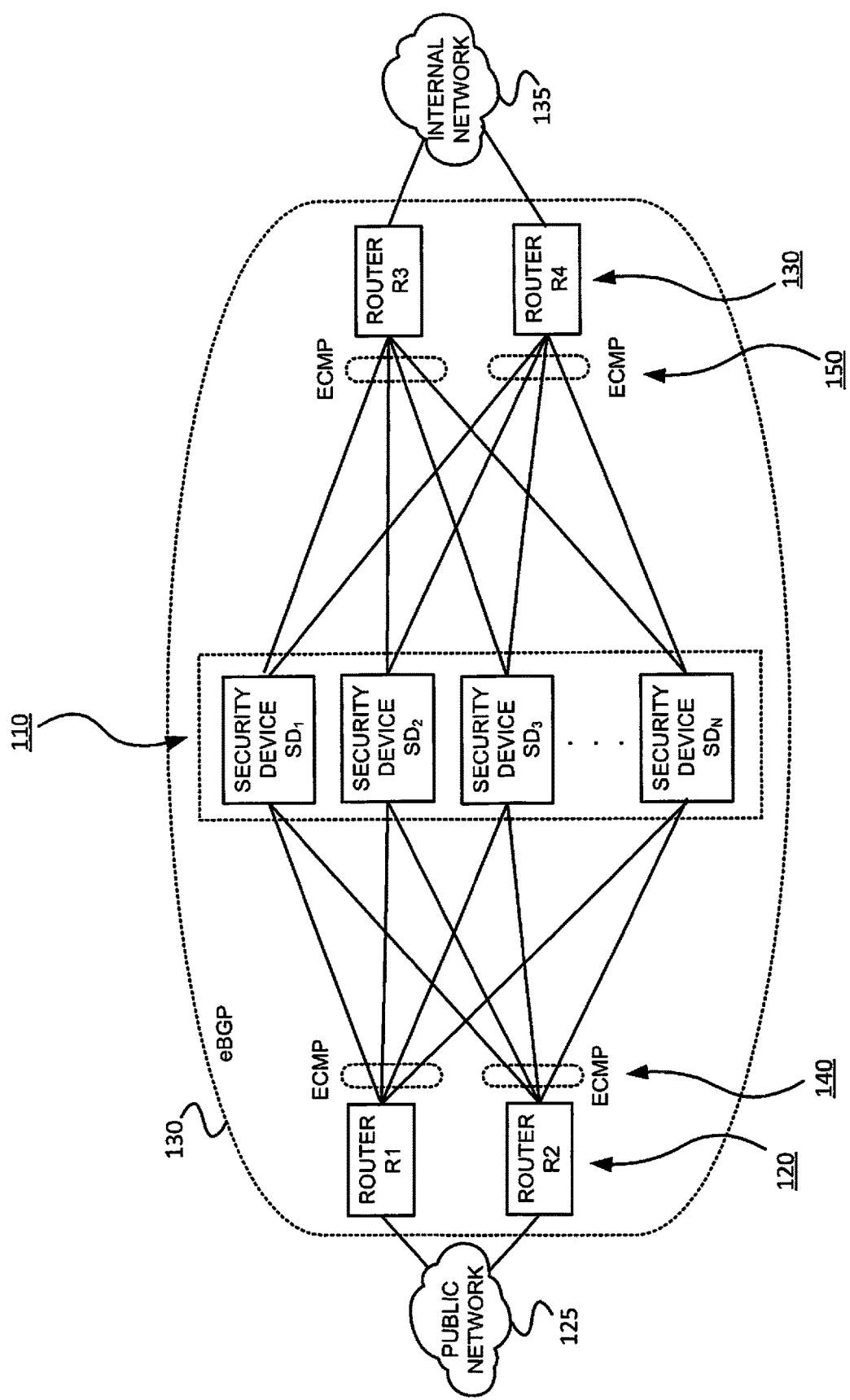
FIG. 1 illustrates an example network topology in which a pool or group of security devices provide security for upstream routers and downstream routers.

The present disclosure may involve novel methods, apparatus, message formats, and/or data structures to efficiently reduce or minimize overhead of state synchronization of (e.g., many) redundant security devices. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 DEFINITIONS

"Consistent hash ring algorithm" is an algorithm or process shared among multiple devices such that each device can independently determine a consistent hash ring, or a consistent location on a hash ring, from a given input or inputs.

"Security device" is a device that provides security functionality (and perhaps routing functionality as well). Security device is intended to include hardware and software (also referred to as "physical" or "real") security devices and instances of virtual security devices. Virtualized security devices may be launched on public provider clouds for example. Thus, a security device may include hardware, software, or some combination of hardware and software. A security device may be referred to as an "application level gateway."

An "available" security device can provide security functionality, and perhaps routing functionality as well. A security device that is "available" might include a state in the security device is recovering from a failure, a state in which the security device has completed a restart, and the like. An "available" security device might be in an "UP" state, or in a "COLD" state. More specifically, when a security device is in an UP state, it is operable, is ready to provide stateful security, and has all needed flow state information. When a security device is in the process of receiving some needed flow state information (e.g., having incomplete synchronization), such a security device can be considered to be in a partially up, or "COLD", state. For example, a "recovering" security might have no packet flow state information (COLD), incomplete packet flow state information (COLD), or complete packet flow state information (UP). Thus, in the cases of a recovering security device having no packet flow state information or incomplete packet flow state information, the recovering security device can be said to be "COLD", but "warming up" as it receives more packet flow state information. Therefore, a recovering SD might not be ready to provide security functions, and a COLD state might be considered to be a transition state between a DOWN state and an UP state. A security device that is not "available" (e.g., not UP and not COLD) is said to be "unavailable.".

§ 4.2 OVERVIEW OF CONFIGURED SYSTEM

In an example system consistent with the present description, the grouped security devices connect to downstream routers and to upstream routers to exchange control information via routing protocols. The grouped security devices also provide network security service(s) for IP packets transiting them, either from an upstream router to a downstream router, or from a downstream router to an upstream router. A network security service is "stateful" per flow of bidirectional IP packets transiting a security device. Therefore, a security device creates, stores, updates, and deletes the state of each flow of bidirectional IP packets that is processes. In some example embodiments consistent with the present description, a flow is defined by a tuple of IP packet header data (e.g., source IP address, destination IP address, etc.).

To prevent the potential failure of a security device(s) from interrupting a "stateful" network security service, there needs to be a redundant copy of the state information of each flow. This redundant copy of state information may be stored on another device, such as on another security device. As noted above, routers may use ECMP forwarding for each packet flow, toward multiple security devices, to achieve networking redundancy. Security devices synchronize state information of each flow with appropriate peer devices to ensure redundancy of stateful network security service. From the perspective of a router, each flow of packets is sent either through a primary ECMP path to a primary security device, or one of several (or more generally, at least one) backup ECMP paths to one of several (or more generally, at least one) backup security devices. With a 1:M redundancy model of network security service, each security device is backed up by M devices; a primary security device for a flow synchronizes its flow states to M backup security devices, where M is equal to greater than 1, but less than N. When the total number of security devices (denoted by N) is large, M is, as a practical matter, much less than N. Thus, sharing per flow state information among M security devices scales independent of the total number N of security devices in the pool.

By sharing flow state information among M security devices, these M security devices and their neighbor routers will have an identical (or almost identical) view of primary and backup security devices for each packet flow. In example embodiments consistent with the present description, this is achieved by having these routers and security devices share and use the same consistent hash algorithm to determine an identical set of primary and backup security devices for each packet flow. Leveraging this identical view, security devices with 1:M redundancy model limit the scope of synchronization of state of each packet flow only among the primary device and M backup devices assigned to the flow, rather than among all N devices. As a result, efficiency of flow state synchronization is significantly increased (especially if M<<N), and the load of flow state synchronization for each security device is independent of the total number (N) of security devices. Conventionally, state synchronization among N devices is an $O(N^2)$ problem. However, with example embodiments consistent with the present description, state synchronization for each security device is limited to M devices, and state synchronization of the total number (N) of security devices is an O(NM) problem, where M<<N. As should be appreciated from the foregoing, the larger the N:M ratio is, the more the efficiency of flow state synchronization is increased.

Applying a consistent hash algorithm permits routers to reduce shuffling flows of packets across security devices after failure (going into a DOWN state; that is, becoming unavailable) and recovery (entering an UP state; that is, becoming available). Generally, routers redirect only the flows located on the segment between the SD going UP and DOWN and its immediate neighbor SDs on the consistent hash ring; instead of redirecting flows located outside that segment. Consequently, a portion of redirected packet flows are reduced or limited with consistent hash algorithm compared to conventional hash algorithm. Applying a consistent hash algorithm also permits security devices to identify the primary security device and backup device(s) for a given packet flow easily. The input of a consistent hash algorithm is an IP packet flow defined by a tuple of the packet's header data (e.g., source IP address, destination IP address, etc.).

To ensure symmetric routing required by security devices, downstream routers and upstream routers use the same information with data extracted from IP packet's header as the input to consistent hash algorithm. For example, in one example embodiment consistent with the present description, the source and destination IP address are maintained as input to the consistent hash algorithm for the upstream (or downstream) routers, but reversed before input to the consistent hash algorithm for the downstream (or upstream) routers. Consequently, downstream routers and upstream routers get the same result (output) of the consistent hash function for packets of the same bidirectional flow. Further, a security device receives packets from both downstream routers and upstream routers, and may extract different data from the packet's header to be used as input to the consistent hash algorithm applied by the security device. Consequently, when a security device receives a packet from a downstream router or from an upstream router, the security device extracts the same data from the packet's header as the router did, and uses the data extracted from the packet header as input to the same consistent hash algorithm. As a result, a security device and its neighbor router get the same result of consistent hash function for a packet sent from the router to the device, regardless of whether the neighbor router is upstream or downstream from the security device.

Figure 2:
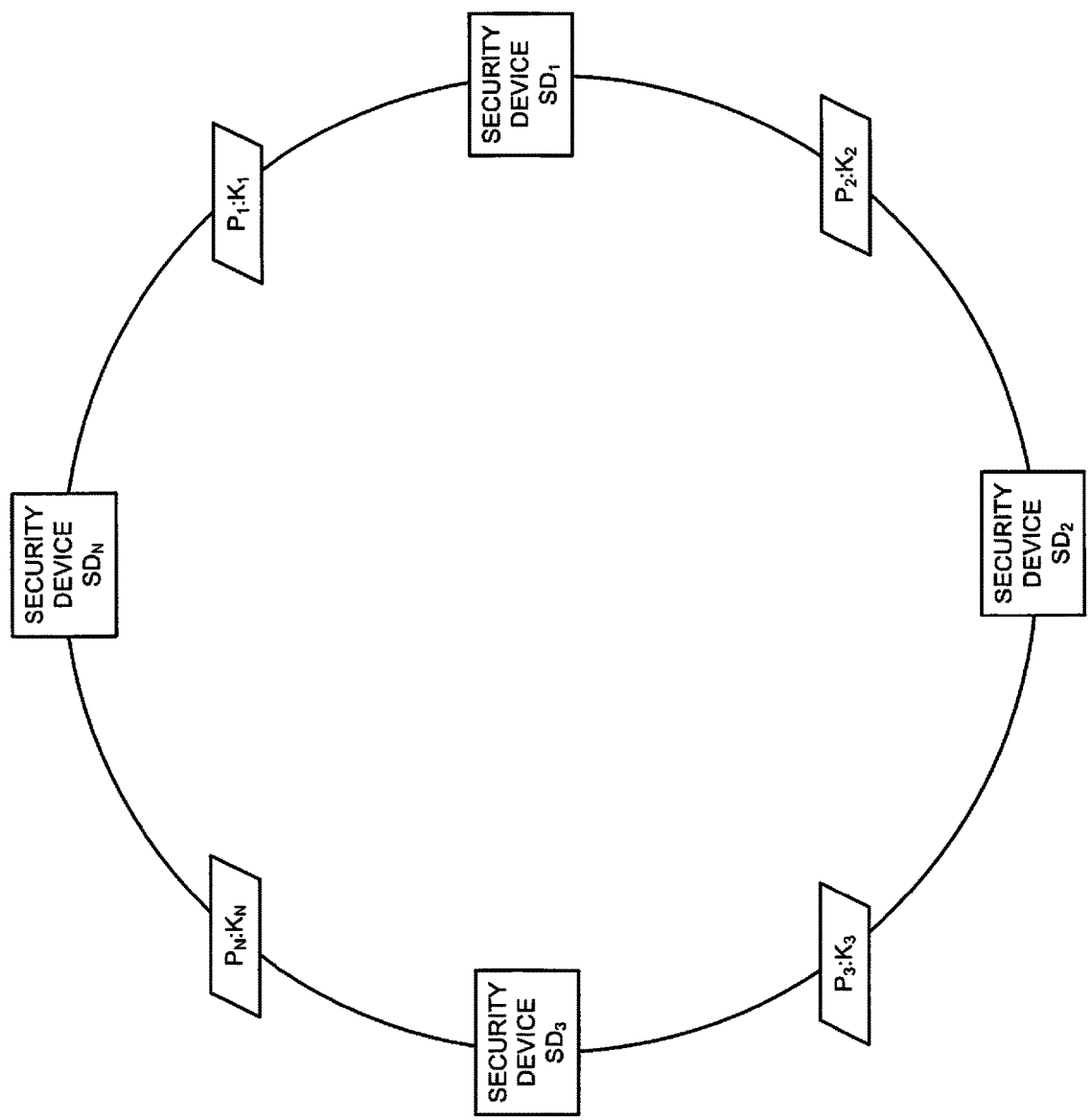
FIG. 2 illustrates assignments of packet flows and security devices on a consistent hash ring.

The result or output of the consistent hash algorithm is a location on a consistent hash ring. All N security devices are assigned to locations (e.g., evenly) distributed on the consistent hash ring according to their unique identifier(s) (e.g., their IP addresses (e.g., loopback addresses), their device IDs, security device configuration information, layer 2 (e.g., MAC) addresses, etc.). All security devices and neighbor routers share this assignment (since they apply the same information as input to the same consistent hash algorithm). FIG. 2 illustrates assignments of packet flows and security devices on the consistent hash ring. In FIG. 2, SDi denotes the $i^{th}$ security device out of N security devices. Pi and Ki denote a flow of packets (P) with the same hash key (K), respectively.

Assume first, a scenario in which no security device fails. In this scenario, for each packet flow, the primary security device for the given packet flow is the security device located after flow's location (determined by applying data extracted from the flow packet's header, as input to the consistent hash algorithm) on the consistent hash ring in a given direction (e.g., the clockwise direction). The given flow's M backup security device(s) are next M security device(s) after the primary security device located on consistent hash ring in the given (e.g., clockwise) direction. A packet flow is said to be "owned" by its primary security device unless and until that primary security device fails.

Assume now that a security device fails (or otherwise goes DOWN; that is, becomes unavailable). Responsive to its failure, the security device is considered to be removed from the consistent hash ring. As a result, packet flows previously "owned by" the failed security device will be "owned" (sequentially) by a next available one of M backup security devices located on the consistent hash ring in the (e.g., clockwise) direction. (Note that if "stateful" security is not strictly required, packet flows previously owned by the failed security device will be owned by a next available one of the N security devices located on the consistent hash ring in the (e.g., clockwise) direction.)

Assume now that a failed security device recovers (or otherwise enters the UP state; that is, becomes available). In response, this security device is considered to be added back to the consistent hash ring. Consequently, the ownership of packet flows that had previously migrated from the recovered security device to a backup security device, will be returned to recovered primary security device.

Figure 3:
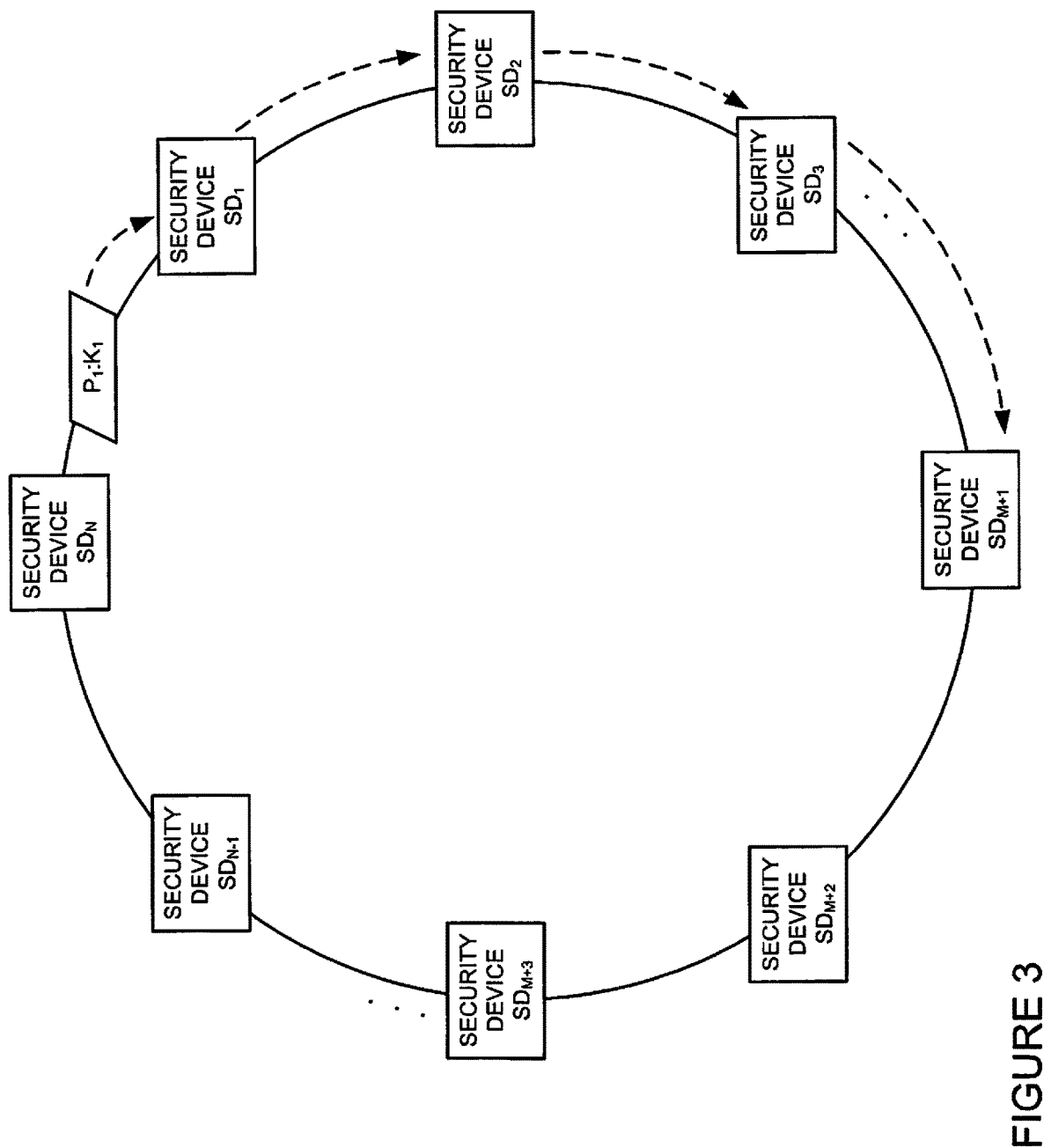
FIG. 3 illustrates the association of a packet flow to its primary security device and N backup security devices on the consistent hash ring.

FIG. 3 illustrates the association of a packet flow to its primary security device and M backup security devices on the consistent hash ring. As shown, $SD_1$ is assigned as the primary security device for packet flow $P_1$, and devices $SD_2$ to $SD_{M+1}$ are assigned as the M backup security devices for packet flow $P_1$. The order for a backup security device to receive packets of flow $P_1$ when its primary security device $SD_1$ is DOWN or otherwise unavailable, is sorted based on its location relative to (e.g., in the clockwise direction) the locations of the other backup security devices on the consistent hash ring. That is, security devices $D_2$, $D_3$ and $D_{M+1}$ are the first, second and $M^{th}$ backup devices assigned to packet flow $P_1$.

The upstream and downstream routers apply a consistent hash algorithm to identify the primary security device "owning" a given flow of packets. The identified primary security device is used as the (e.g., ECMP) next hop for packets of the flow. When the primary security device to which a packet flow is assigned works properly (that is, is UP or otherwise available), routers send packets of the flow toward its assigned primary security device. Otherwise, routers redirect packets of the flow toward its the backup security device owning the packet flow (that is, the next available (on the consistent hash ring) backup security device for the packet flow).

§ 4.3 EXAMPLE METHOD(S)

Figure 4A:
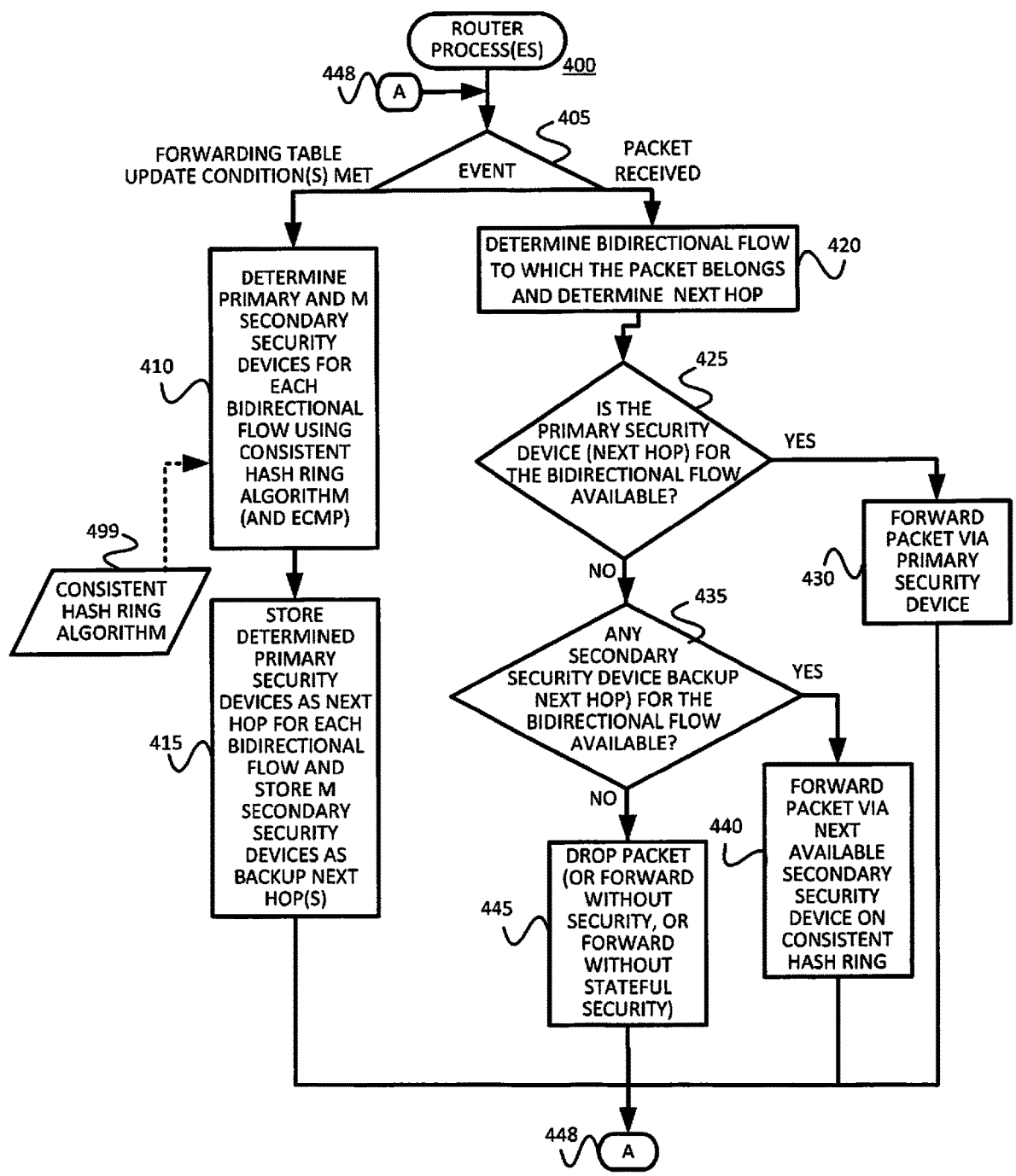
FIGS. 4A and 4B are flow diagrams of example methods performed by an upstream or downstream router and by a security device, respectively.
Figure 4B:
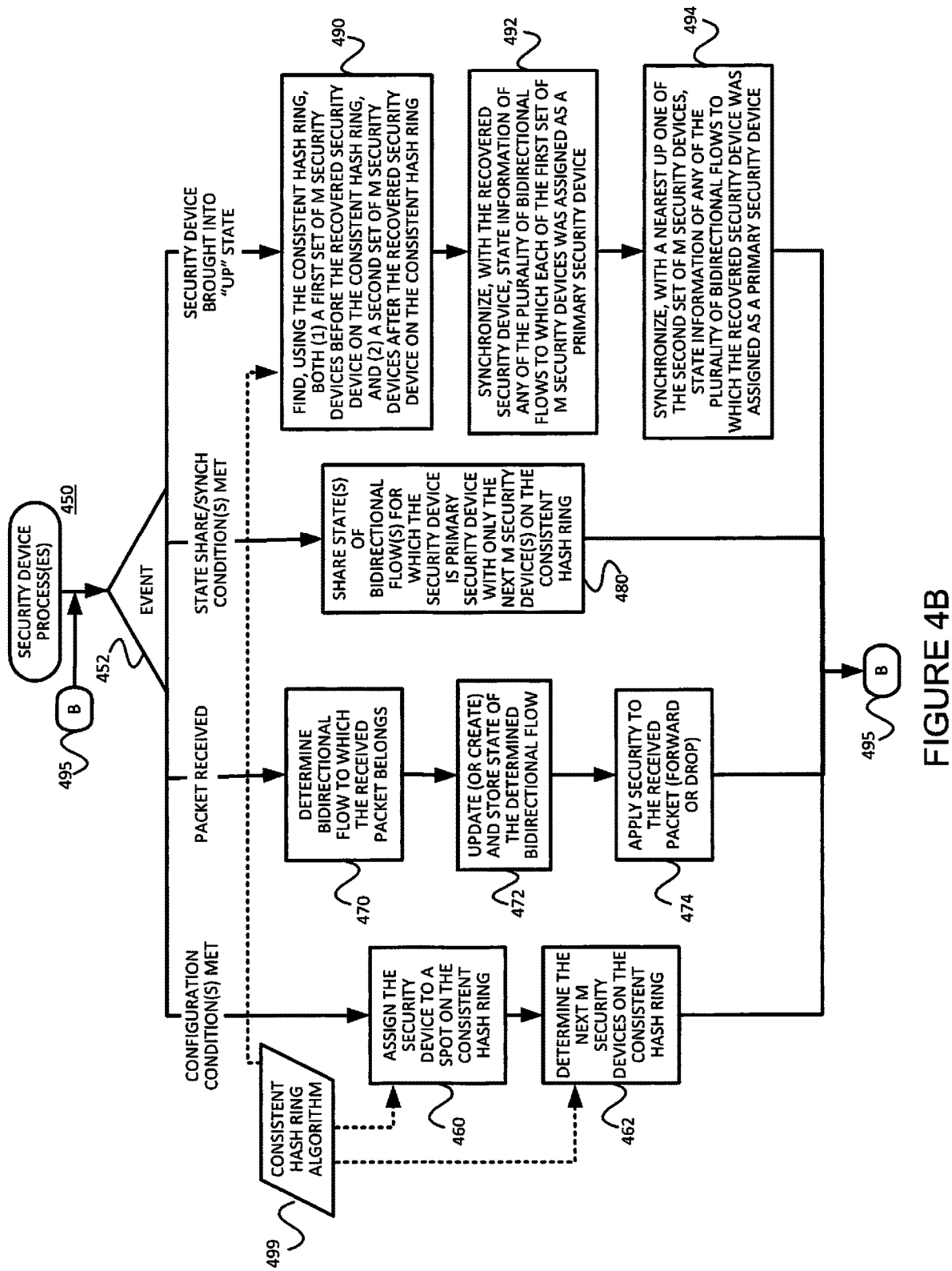

FIGS. 4A and 4B are flow diagrams of example methods 400 and 450 performed by an upstream or downstream router and by a security device, respectively. Referring first to FIG. 4A, different branches of the example method 400 are performed in response to the occurrence of different events. (Event branch point 405) For example, in response to one or more condition(s) for updating the forwarding table of the router being met, the example method 400 performs the left branch of the example method 400. Note that various conditions may be used to trigger an update of the forwarding table. Such conditions might include, for example, the receipt of a packet, the receipt of interior gateway protocol (IGP) information, the receipt of network topology information in a protocol advertisement, etc. Referring to the left branch, the example method 400 determines a primary security device and M (wherein M is at least one) secondary security devices for each bidirectional flow using a consistent hash ring algorithm 499. (Block 410) The example method 400 then stores, for each bidirectional flow, the determined primary security device as a next hop, as well as the M secondary security device(s) as backup next hop(s). (Block 415) The example method 400 then branches back to event branch point 405 via node A (448).

Referring again to event branch point 405, in response to receiving a packet (for example from a public network 125 if the router running the method 400 is an upstream router 120, or from an internal network 135 if the router running the method 400 is a downstream router 130), the right branch of the example method 400 is performed. More specifically, the example method 400 determines a bidirectional flow to which the packet belongs and determines the (e.g., ECMP) next hop. (Block 420) That is, in effect, the example method 400 determines one of the plurality of N security devices to which the determined bidirectional flow was assigned as a primary security device. Next, it is determined whether or not the primary security device (the next hop) is available. If it is available (Decision 425=YES), the method 400 forwards the packet via the primary security device (Block 430) before the method branches back to event branch point 405 via node A (448). If, on the other hand, it is determined that the primary security device is not available (Decision 425=NO), the example method 400 determines whether or not any of M security devices on the consistent hash ring (that is, any of the backup next hops) is available. If one is available (Decision 435=YES), the example method 400 forwards the received new packet to the determined next available one of the plurality of M security devices on the consistent hash ring (Block 440), before the example method 400 branches back to event branch point 405 via node A (448). If, on the other hand, it is determined that none of M security devices on the consistent hash ring (that is, any of the backup next hops) is available (Decision 445=NO), the example method 400 may invoke one of: (A) a no security option in which the packet is forwarded without any security (e.g., by bypassing the pool of security devices, which is likely not a practical option as it opens a security vulnerability), (B) a non-stateful security option in which the packet is forwarded by a security device other than the primary or M backup(s) devices (e.g., a next available one of the N security devices), which will not have state information for the flow to which the packet belongs, or (C) an extreme security option in which the packet is dropped (Block 445), before the example method 400 branches back to event branch point 405 via node A (448).

Referring next to FIG. 4B, different branches of the example method 450 are performed in response to the occurrence of different events. (Event branch point 452) For example, in response to one or more condition(s) for configuring the security device being met, the example method 450 performs the left-most branch of example method 450. More specifically, the example method 450 assigns, using the consistent hash ring algorithm 499 (which is the same as that 499 used by the example method 400 of FIG. 4A) for generating a consistent hash ring, the security device to a spot on the consistent hash ring (Block 460) and determines the next M security devices on the consistent hash ring (Block 462). The example method 450 then branches back to event branch point 452 via node B (495).

Referring back to event branch point 452, responsive to receiving, from either (A) one of the at least one upstream router, or (B) one of the at least one downstream router, a packet, the example method 450 performs the second from the left branch. More specifically, the example method 450 determines the bidirectional flow to which the packet belongs (Block 470), updates a state of the given bidirectional flow to which the received packet belongs (or creates a new one if a state does not already exist) (Block 472), and applies security to the received packet (e.g., forwards the packet, drops the packet, copies the packet, redirects the packet, etc.) (Block 474). The example method 450 then branches back to event branch point 452 via node B (495).

Referring back to event branch point 452, responsive to one or more conditions for sharing/synchronizing flow state information being met, the second from right branch of the example method 450 is performed. More specifically, the example method 450 synchronizes the stored state of the given bidirectional flow for which the security device is the primary security device (or for which the security device is a backup security device receiving packets responsive to the primary security device being DOWN) with the set of M backup security device(s), which are UP, assigned to the given bidirectional flow (that is, security devices in UP state within the next M security devices (e.g., in the clockwise direction) of the primary security device on the consistent hash ring), but not with all of the N security devices. (Block 480) The example method 450 then branches back to event branch point 452 via node B (495).

Referring back to event branch point 452, responsive to the security device being brought into the "UP" state, the right-most branch of the example method 450 is performed. More specifically, the example method 450 finds, using the consistent hash ring algorithm 499, both (1) a first set of M available security devices before the security device on the consistent hash ring, and (2) a second set of M available security devices after the security device on the consistent hash ring. (Block 490) The example method 450 then synchronizes, with the UP security device, state information of any of the plurality of bidirectional flows to which each of the first set of M security devices was assigned as a primary security device (Block 492) and synchronizes, with a nearest one of the second set of M security devices in an UP state, state information of any of the plurality of bidirectional flows to which the UP security device performing the method 450 was assigned as a primary security device (Block 494). The example method 450 then branches back to event branch point 452 via node B (495).

Referring back to block 490, although this act of finding, using the consistent hash ring algorithm 499, both (1) a first set of M security devices before the security device on the consistent hash ring, and (2) a second set of M security devices after the security device on the consistent hash ring responsive to the security device being brought into the "UP" state, this act of finding can be performed regardless of the security device being brought into the UP state.

Note that when the security device goes into a DOWN state, the example method 450 need not do anything because this will be recognized by the upstream and downstream routers. (Recall, e.g., 425 and 435 of FIG. 4A.)

§ 4.4 EXAMPLE APPARATUS

Figure 5:
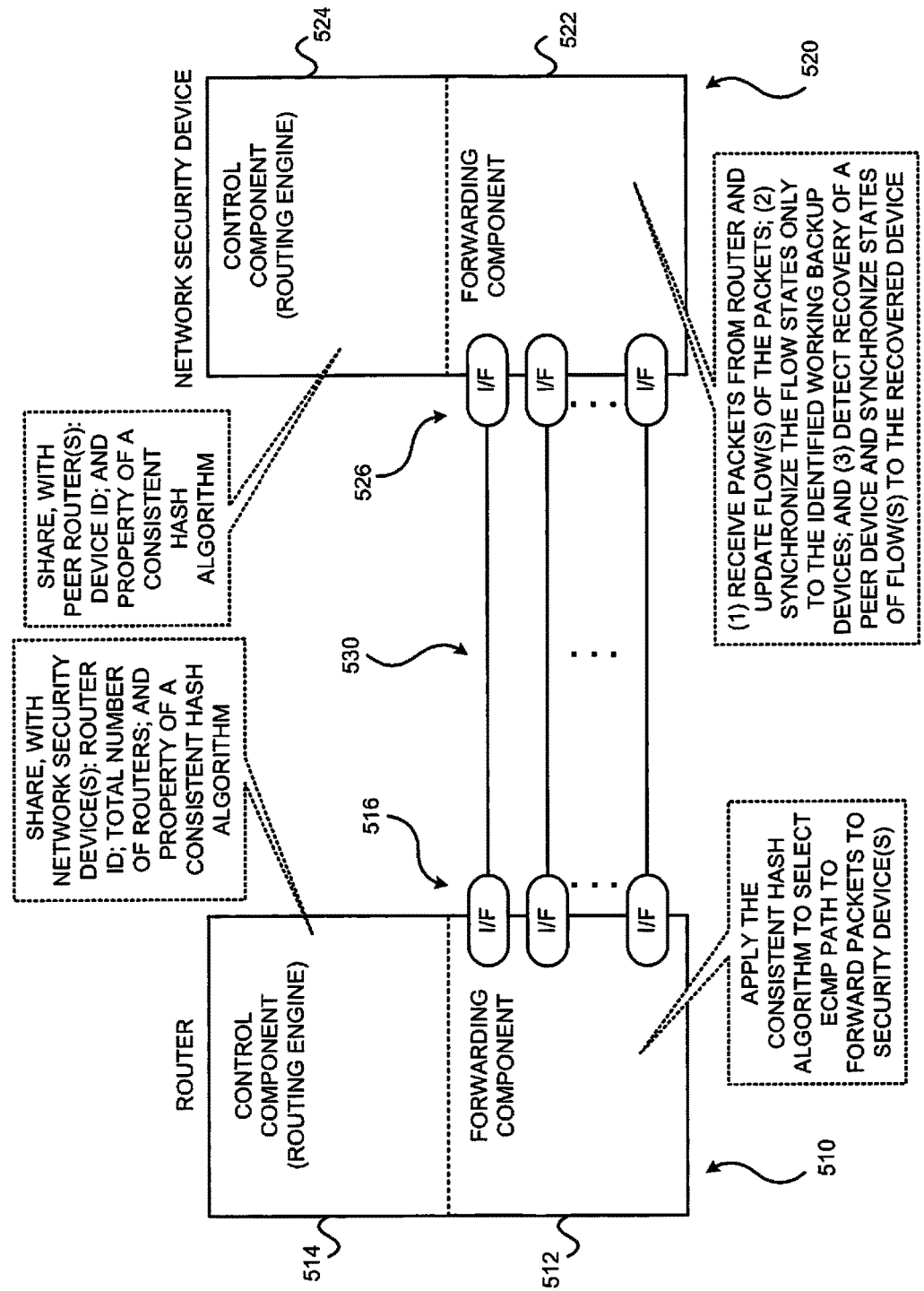
FIG. 5 illustrates two data forwarding systems, which may be used as nodes, coupled via communications links, in a communications network, such as communications network employing routers and security devices.

FIG. 5 illustrates two data forwarding systems 510 and 520 coupled via communications links 530. The links may be physical links or "wireless" links. The data forwarding systems 510 and 520 may be a router and a security device, respectively, for example. Note that the security device 520 may include functions of a router as well. The data forwarding systems 510,520 each may include a control component (e.g., a routing engine) 514,524 and a forwarding component 512,522. Each data forwarding system 510,520 includes one or more interfaces 516,526 that terminate one or more communications links 530.

Still referring to FIG. 5, the control component 514 of router 510 may function to share, with network security device(s) 520, a router ID, a total number of routers, and property of a consistent hash algorithm. The control component 524 of network security device 520 may function to share, with peer routers, a device ID, a total number of security devices, and property of a consistent hash algorithm. The forwarding component 512 of router 510 may apply the consistent hash algorithm to select an ECMP path to forward packets of a flow(s) to a security device(s). Finally, the forwarding component 522 of network security device 520 may (1) receive packets from the router and update the state of the corresponding flow, (2) synchronize flow states with working backup security devices for the given flow, and (3) detect recovery of a peer security device and synchronize state(s) of flow(s) to the recovered peer security device. Example embodiments consistent with the present description can be integrated in a control plane and a data plane of a network router and a security device and be implemented with software and/or hardware as an advanced feature of a router and a security device.

As just discussed above, and referring to FIG. 6, some example data forwarding devices such as security devices and routers 600 include a control component (e.g., routing engine) 610 and a packet forwarding component (e.g., a packet forwarding engine) 690.

The control component 610 may include an operating system (OS) kernel 620, routing protocol process(es) 630, label-based forwarding protocol process(es) 640, interface process(es) 650, user interface (e.g., command line interface) process(es) 660, and chassis process(es) 670, and may store routing table(s) 639, label forwarding information 645, and forwarding (e.g., route-based and/or label-based) table(s) 680. As shown, the routing protocol process(es) 630 may support routing protocols such as the routing information protocol ("RIP") 631, the intermediate system-to-intermediate system protocol ("IS-IS") 632, the open shortest path first protocol ("OSPF") 633, the enhanced interior gateway routing protocol ("EIGRP") 634 and the border gateway protocol ("BGP") 635, and the label-based forwarding protocol process(es) 640 may support protocols such as BGP 635, the label distribution protocol ("LDP") 636, the resource reservation protocol ("RSVP") 637, EVPN 638 and L2VPN 639. One or more components (not shown) may permit a user 665 to interact with the user interface process(es) 660. Similarly, one or more components (not shown) may permit an outside device to interact with one or more of the router protocol process(es) 630, the label-based forwarding protocol process(es) 640, the interface process(es) 650, and the chassis process(es) 670, via SNMP 685, and such processes may send information to an outside device via SNMP 685.

The packet forwarding component 690 may include a microkernel 692 over hardware components (e.g., ASICs, switch fabric, optics, etc.) 691, interface process(es) 693, ASIC drivers 694, chassis process(es) 695 and forwarding (e.g., route-based and/or label-based) table(s) 696.

Figure 6:
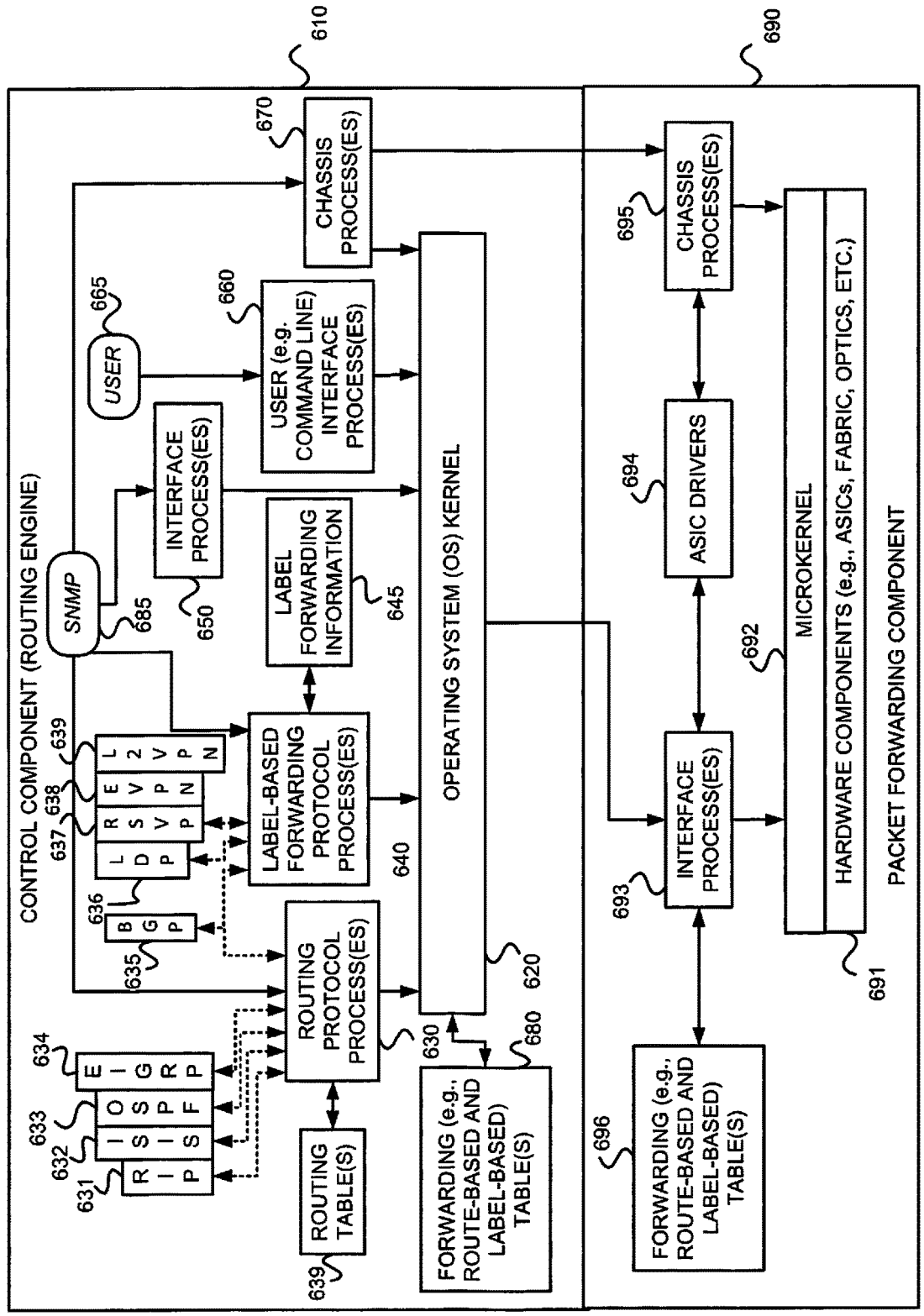
FIG. 6 is a block diagram of a router which may be used a communications network, such as communications network employing routers and security devices.

In the example router 600 of FIG. 6, the control component 610 handles tasks such as performing routing protocols, performing label-based forwarding protocols, control packet processing, etc., which frees the packet forwarding component 690 to forward received packets quickly. That is, received control packets (e.g., routing protocol packets and/or label-based forwarding protocol packets) are not fully processed on the packet forwarding component 690 itself, but are passed to the control component 610, thereby reducing the amount of work that the packet forwarding component 690 has to do and freeing it to process packets to be forwarded efficiently. Thus, the control component 610 is primarily responsible for running routing protocols and/or label-based forwarding protocols, maintaining the routing tables and/or label forwarding information, sending forwarding table updates to the packet forwarding component 690, and performing system management. The example control component 610 may handle routing protocol packets, provide a management interface, provide configuration management, perform accounting, and provide alarms. The processes 630, 640, 650, 660 and 670 may be modular, and may interact with the OS kernel 620. That is, nearly all of the processes communicate directly with the OS kernel 620. Using modular software that cleanly separates processes from each other isolates problems of a given process so that such problems do not impact other processes that may be running. Additionally, using modular software facilitates easier scaling.

Still referring to FIG. 6, the example OS kernel 620 may incorporate an application programming interface ("API") system for external program calls and scripting capabilities. The control component 610 may be based on an Intel PCI platform running the OS from flash memory, with an alternate copy stored on the router's hard disk. The OS kernel 620 is layered on the Intel PCI platform and establishes communication between the Intel PCI platform and processes of the control component 610. The OS kernel 620 also ensures that the forwarding tables 696 in use by the packet forwarding component 690 are in sync with those 680 in the control component 610. Thus, in addition to providing the underlying infrastructure to control component 610 software processes, the OS kernel 620 also provides a link between the control component 610 and the packet forwarding component 690.

Referring to the routing protocol process(es) 630 of FIG. 6, this process(es) 630 provides routing and routing control functions within the platform. In this example, the RIP 631, ISIS 632, OSPF 633 and EIGRP 634 (and BGP 635) protocols are provided. Naturally, other routing protocols may be provided in addition, or alternatively. Similarly, the label-based forwarding protocol process(es) 640 provides label forwarding and label control functions. In this example, the LDP 636, RSVP 637, EVPN 638 and L2VPN 639 (and BGP 635) protocols are provided. Naturally, other label-based forwarding protocols (e.g., MPLS, SR, etc.) may be provided in addition, or alternatively. In the example router 600, the routing table(s) 639 is produced by the routing protocol process(es) 630, while the label forwarding information 645 is produced by the label-based forwarding protocol process(es) 640.

Still referring to FIG. 6, the interface process(es) 650 performs configuration of the physical interfaces and encapsulation.

The example control component 610 may provide several ways to manage the router. For example, it 610 may provide a user interface process(es) 660 which allows a system operator 665 to interact with the system through configuration, modifications, and monitoring. The SNMP 685 allows SNMP-capable systems to communicate with the router platform. This also allows the platform to provide necessary SNMP information to external agents. For example, the SNMP 685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 610, thereby avoiding slowing traffic forwarding by the packet forwarding component 690.

Although not shown, the example router 600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 660 via a console port, an auxiliary port, and/or a management Ethernet port.

The packet forwarding component 690 is responsible for properly outputting received packets as quickly as possible. If there is no entry in the forwarding table for a given destination or a given label and the packet forwarding component 690 cannot perform forwarding by itself, it 690 may send the packets bound for that unknown destination off to the control component 610 for processing. The example packet forwarding component 690 is designed to perform Layer 2 and Layer 3 switching, route lookups, and rapid packet forwarding.

As shown in FIG. 6, the example packet forwarding component 690 has an embedded microkernel 692 over hardware components 691, interface process(es) 693, ASIC drivers 694, and chassis process(es) 695, and stores a forwarding (e.g., route-based and/or label-based) table(s) 696. The microkernel 692 interacts with the interface process(es) 693 and the chassis process(es) 695 to monitor and control these functions. The interface process(es) 692 has direct communication with the OS kernel 620 of the control component 610. This communication includes forwarding exception packets and control packets to the control component 610, receiving packets to be forwarded, receiving forwarding table updates, providing information about the health of the packet forwarding component 690 to the control component 610, and permitting configuration of the interfaces from the user interface (e.g., CLI) process(es) 660 of the control component 610. The stored forwarding table(s) 696 is static until a new one is received from the control component 610. The interface process(es) 693 uses the forwarding table(s) 696 to look up next-hop information. The interface process(es) 693 also has direct communication with the distributed ASICs. Finally, the chassis process(es)

695 may communicate directly with the microkernel 692 and with the ASIC drivers 694.

Referring back to FIG. 5, certain functions of the router consistent with the present description may be performed by the control component 514, while other functions are performed by the forwarding component 512. Similarly, certain functions of the network security device consistent with the present description may be performed by the control component 524, while other functions are performed by the forwarding component 522.

Figure 7:
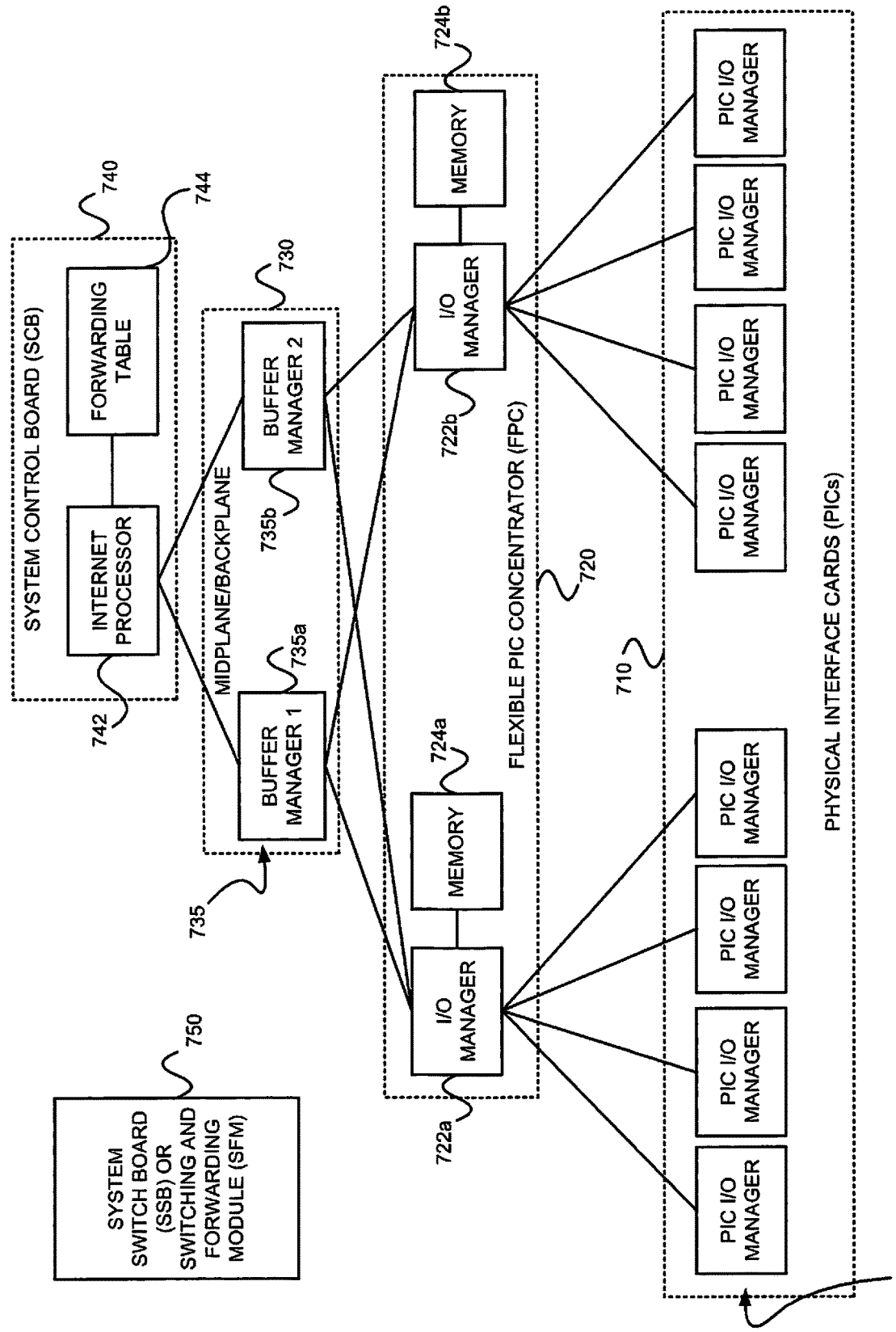
FIG. 7 is an example architecture in which ASICS may be distributed in a packet forwarding component to divide the responsibility of packet forwarding.

FIG. 7 is an example of how the ASICS may be distributed in the packet forwarding component 690 to divide the responsibility of packet forwarding. As shown in FIG. 7, the ASICs of the packet forwarding component 690 may be distributed on physical interface cards ("PICs") 710, flexible PIC concentrators ("FPCs") 720, a midplane or backplane 730, and a system control board(s) 740 (for switching and/or forwarding). Switching fabric is also shown as a system switch board ("SSB"), or a switching and forwarding module ("SFM") 750 (which may be a switch fabric 750' as shown in FIGS. 8A and 8B). Each of the PICs 710 includes one or more PIC I/O managers 715. Each of the FPCs 720 includes one or more I/O managers 722, each with an associated memory 724 (which may be a RDRAM 724' as shown in FIGS. 8A and 8B). The midplane/backplane 730 includes buffer managers 735a, 735b. Finally, the system control board 740 includes an internet processor 742 and an instance of the forwarding table 744 (Recall, e.g., 696 of FIG. 6).

Still referring to FIG. 7, the PICs 710 contain the interface ports. Each PIC 710 may be plugged into an FPC 720. Each individual PIC 710 may contain an ASIC that handles media-specific functions, such as framing or encapsulation. Some example PICs 710 provide SDH/SONET, ATM, Gigabit Ethernet, Fast Ethernet, and/or DS3/E3 interface ports.

An FPC 720 can contain from one or more PICs 710, and may carry the signals from the PICs 710 to the midplane/backplane 730 as shown in FIG. 7.

The midplane/backplane 730 holds the line cards. The line cards may connect into the midplane/backplane 730 when inserted into the example router's chassis from the front. The control component (e.g., routing engine) 610 may plug into the rear of the midplane/backplane 730 from the rear of the chassis. The midplane/backplane 730 may carry electrical (or optical) signals and power to each line card and to the control component 610.

The system control board 740 may perform forwarding lookup. It 740 may also communicate errors to the routing engine. Further, it 740 may also monitor the condition of the router based on information it receives from sensors. If an abnormal condition is detected, the system control board 740 may immediately notify the control component 610.

Referring to FIGS. 7, 8A and 8B, in some exemplary routers, each of the PICs 710,710' contains at least one I/O manager ASIC 715 responsible for media-specific tasks, such as encapsulation. The packets pass through these I/O ASICs on their way into and out of the router. The I/O manager ASIC 715 on the PIC 710,710' is responsible for managing the connection to the I/O manager ASIC 722 on the FPC 720,720', managing link-layer framing and creating the bit stream, performing cyclical redundancy checks (CRCs), and detecting link-layer errors and generating alarms, when appropriate. The FPC 720 includes another I/O manager ASIC 722. This ASIC 722 (shown as a layer 2/layer 3 packet processing component 710'/720') takes the packets from the PICs 710 and breaks them into (e.g., 74-byte) memory blocks. This FPC I/O manager ASIC 722 (shown as a layer 2/layer 3 packet processing component 710'/720') sends the blocks to a first distributed buffer manager (DBM) 935a (shown as switch interface component 735a'), decoding encapsulation and protocol-specific information, counting packets and bytes for each logical circuit, verifying packet integrity, and applying class of service (CoS) rules to packets. At this point, the packet is first written to memory. More specifically, the example DBM ASIC 735/735a' manages and writes packets to the shared memory 724 across all FPCs 720. In parallel, the first DBM ASIC 735/735a' also extracts information on the destination of the packet and passes this forwarding-related information to the Internet processor 742/742'. The Internet processor 742/742' performs the route lookup using the forwarding table 744 and sends the information over to a second DBM ASIC 735b'. The Internet processor ASIC 742/742' also collects exception packets (i.e., those without a forwarding table entry) and sends them to the control component 610. The second DBM ASIC 725 (shown as a queuing and memory interface component 735b') then takes this information and the 74-byte blocks and forwards them to the I/O manager ASIC 722 of the egress FPC 720/720' (or multiple egress FPCs, in the case of multicast) for reassembly. (Thus, the DBM ASICs 735a/735a' and 735b/735b' are responsible for managing the packet memory 724/724' distributed across all FPCs 720/720', extracting forwarding-related information from packets, and instructing the FPC where to forward packets.)

The I/O manager ASIC 722 on the egress FPC 720/720' may perform some value-added services. In addition to incrementing time to live ("TTL") values and re-encapsulating the packet for handling by the PIC 710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 722 on the egress FPC 720/720' may be responsible for receiving the blocks from the second DBM ASIC 735/735', incrementing TTL values, queuing a pointer to the packet, if necessary, before applying CoS rules, re-encapsulating the blocks, and sending the encapsulated packets to the PIC I/O manager ASIC 715.

Figure 9:
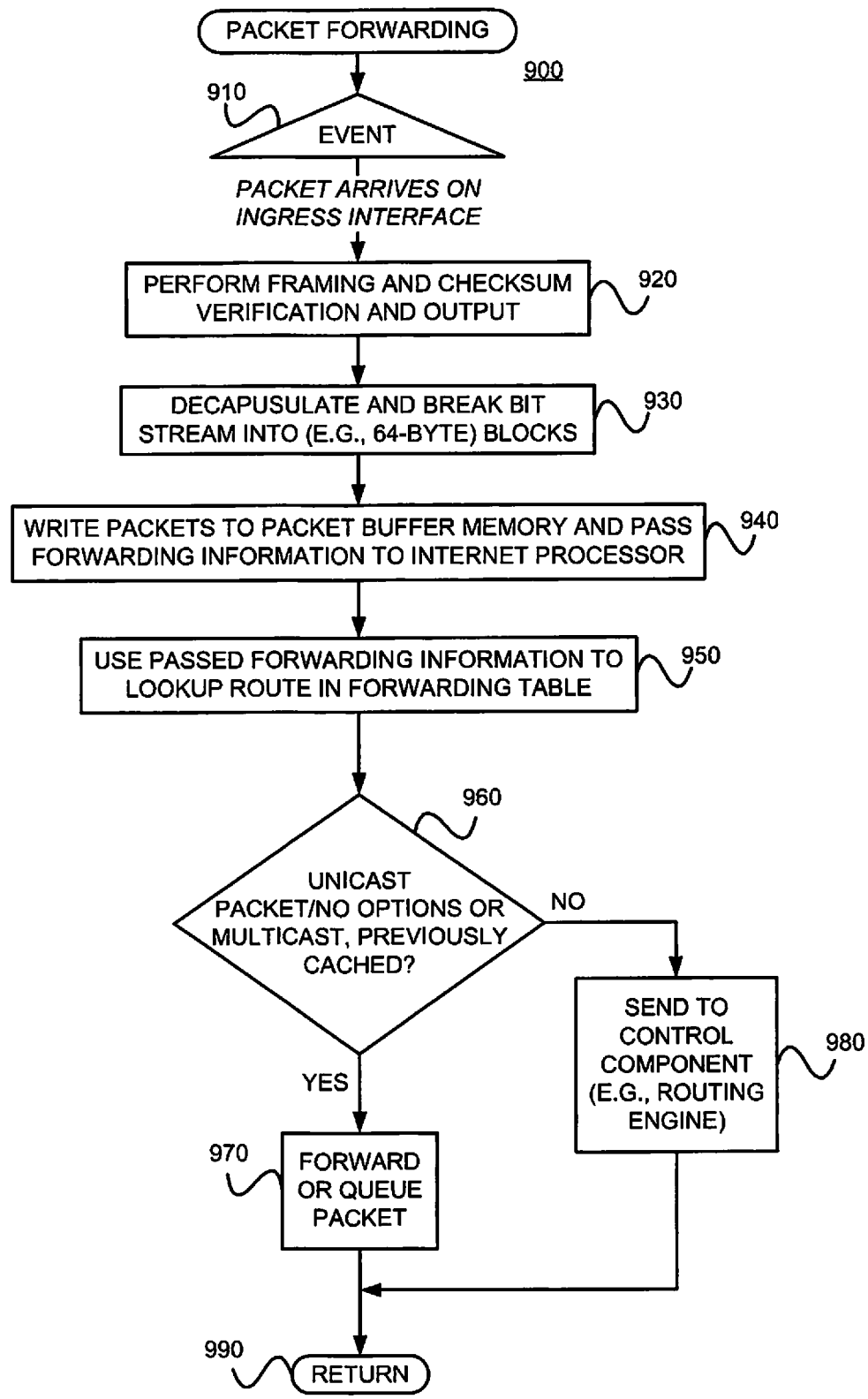
FIG. 9 is a flow diagram of an example method for providing packet forwarding in an example router.

FIG. 9 is a flow diagram of an example method 900 for providing packet forwarding in the example router. The main acts of the method 900 are triggered when a packet is received on an ingress (incoming) port or interface. (Event 910) The types of checksum and frame checks that are required by the type of medium it serves are performed and the packet is output, as a serial bit stream. (Block 920) The packet is then decapsulated and parsed into (e.g., 64-byte) blocks. (Block 930) The packets are written to buffer memory and the forwarding information is passed on the Internet processor. (Block 940) The passed forwarding information is then used to lookup a route in the forwarding table. (Block 950) Note that the forwarding table can typically handle unicast packets that do not have options (e.g., accounting) set, and multicast packets for which it already has a cached entry. Thus, if it is determined that these conditions are met (YES branch of Decision 960), the packet forwarding component finds the next hop and egress interface, and the packet is forwarded (or queued for forwarding) to the next hop via the egress interface (Block 970) before the method 900 is left (Node 990) Otherwise, if these conditions are not met (NO branch of Decision 960), the forwarding information is sent to the control component 610 for advanced forwarding resolution (Block 980) before the method 900 is left (Node 990).

Referring back to block 970, the packet may be queued. Actually, as stated earlier with reference to FIG. 7, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 722 may send a request for the packet to the second DBM ASIC 735*b*. The DBM ASIC 735 reads the blocks from shared memory and sends them to the I/O manager ASIC 722 on the FPC 720, which then serializes the bits and sends them to the media-specific ASIC of the egress interface. The I/O manager ASIC 715 on the egress PIC 710 may apply the physical-layer framing, perform the CRC, and send the bit stream out over the link.

Referring back to block 980 of FIG. 9, as well as FIG. 7, regarding the transfer of control and exception packets, the system control board 740 handles nearly all exception packets. For example, the system control board 740 may pass exception packets to the control component 610.

Although example embodiments consistent with the present description may be implemented on the example routers and/or security devices of FIG. 5 or 6, at least some parts of embodiments consistent with the present description may be implemented on communications network nodes (e.g., routers (real and/or virtualized), security devices (real and/or virtualized), switches, etc.) having different architectures. More generally, embodiments consistent with the present description may be implemented on an example system 900 as illustrated on FIG. 10.

Figure 10:
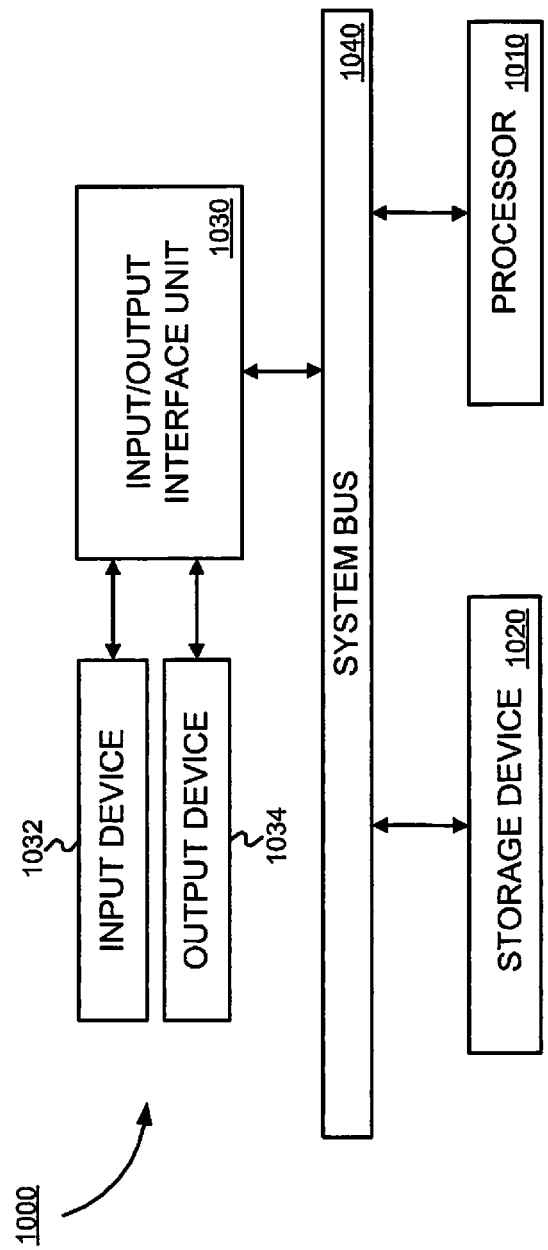
FIG. 10 is a block diagram of an exemplary machine that may perform one or more of the processes described, and/or store information used and/or generated by such processes.

FIG. 10 is a block diagram of an exemplary machine 1000 that may perform one or more of the methods (Recall, e.g., FIGS. 4A and 4B.) described, and/or store information used and/or generated by such processes. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components of the present description.

In some embodiments consistent with the present description, the processors 1010 may be one or more real and/or virtualized microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Some or all parts of example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.5 REFINEMENTS, ALTERNATIVES AND EXTENSIONS

§ 4.5.1 Example Ways of Determining M Backup Security Device(s)

In some example embodiments consistent with the present description, a primary security device identifies M (where M is at least one) backup security devices for any packet flow(s) "possessed by" the primary security device as follows. When determining its M backup security devices, the primary security device can (conceptually) remove itself from the consistent hash ring and use the consistent hash ring algorithm to find a backup device for the packet flow(s) "possessed by" it. If M is greater than one, the primary device can (conceptually) remove itself and any already found backup security device(s) from consistent hash ring, and then use consistent hash algorithm again to identify a next backup security device. This can be repeated until all M backup security devices are identified for packet flow(s) "possessed" by the primary security device. Having identified all M backup devices, a primary security device synchronizes states of its packet flows only to M backup devices if they are functional. (Recall, e.g., block 480 of FIG. 4B.)

Note that the status of each of the security devices can be tracked by one or more upstream router(s) and one or more downstream router(s). Note that the UP/DOWN/COLD state of a security device is not the same as flow state, or bidirectional flow state.

In example embodiments consistent with the present description, a consistent hash is maintained even when security devices (and/or links) are removed or added.

Note that in some example embodiments consistent with the present description, security devices are capable of running routing protocols such as eBGP, OSPF, IS-IS, etc.

§ 4.5.1.1 Example Ways of Determining M Backup Security Device(s) when Multiple Virtual Security Devices are Associated with a Physical (or Real) Security Device The distribution of security devices on a consistent hash ring can be even or uneven. The distribution of security devices on the consistent hash ring may even be augmented with virtual security devices associated to each real (that is, physical) security device to enhance the result of the consistent hash algorithm. For example, one enhanced example embodiment uses virtual security devices of real security devices to distribute flows more uniformly to all security devices with a consistent hash mechanism. Another enhanced example embodiment makes the number of virtual security devices of each real security device proportional to the capacity of the corresponding real security device to better balance the flows or workloads across various security devices (according to the individual capacities of the various security devices).

Figure 13:
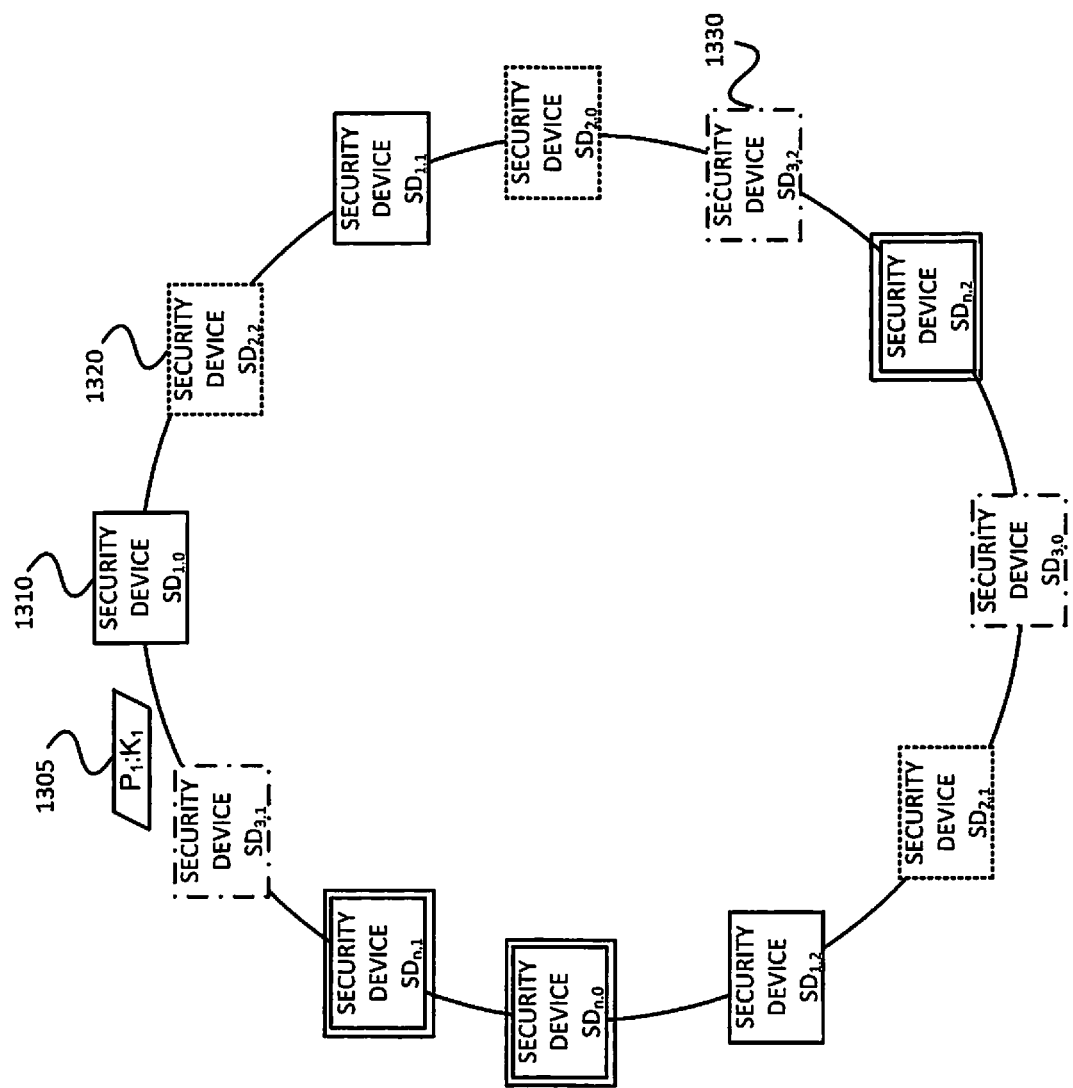
FIG. 13 illustrates the arrangement of virtual security devices (associated with physical security devices) on a consistent hash ring.

To more distribute of flows with consistent hash mechanism more uniformly, in some example embodiments consistent with the present application, a physical network security device can be mapped to multiple virtual network security devices, and each of these virtual security devices is allocated to a location on a consistent hash ring. FIG. 13 illustrates multiple virtual security devices (three in this illustrative example) mapped to each physical network security device. Still referring to FIG. 13, these virtual security devices are allocated on consistent hash ring. In FIG. 13, $SD_{i,0}$, $SD_{i,1}$ and $SD_{i,2}$ are three virtual security devices associated with physical security device $SD_i$, where i is a whole number from 0 to n.

Using virtual security devices as just described need not change how the primary security device of a packet flow is identified using the consistent hash mechanism. More specifically, when virtual security devices are used, the method to identify the M backup SDs of a primary SD along the consistent hash ring ignores or skips virtual security devices that overlap (that is, are associated with) the primary SD and its previously identified backup SD(s). As a result, M unique physical or real SDs that back up the primary SD will be identified. For example, referring to FIG. 13, packet flow $P_1$ 1305 has corresponding hash key $K_1$. The primary SD for packet flow $P_1$ is $SD_1$ (identified by its first associated virtual security device $SD_{1,0}$) 1310. Further, the two unique backup SDs for packet flow $P_1$ are $SD_2$ (identified by virtual security device $SD_{2,2}$) 1320, and then $SD_3$ (identified by virtual security device $SD_{3,2}$) 1330. In this example, virtual security devices $SD_{1,1}$ and $SD_{2,0}$ are ignored or skipped when identifying the backup SDs of $P_1$ because $SD_{1,1}$ and $SD_{2,0}$ are associated with the same physical or real security device as those of previously identified backup $SD_{1,0}$ and $SD_{2,2}$, respectively.

Figure 14:
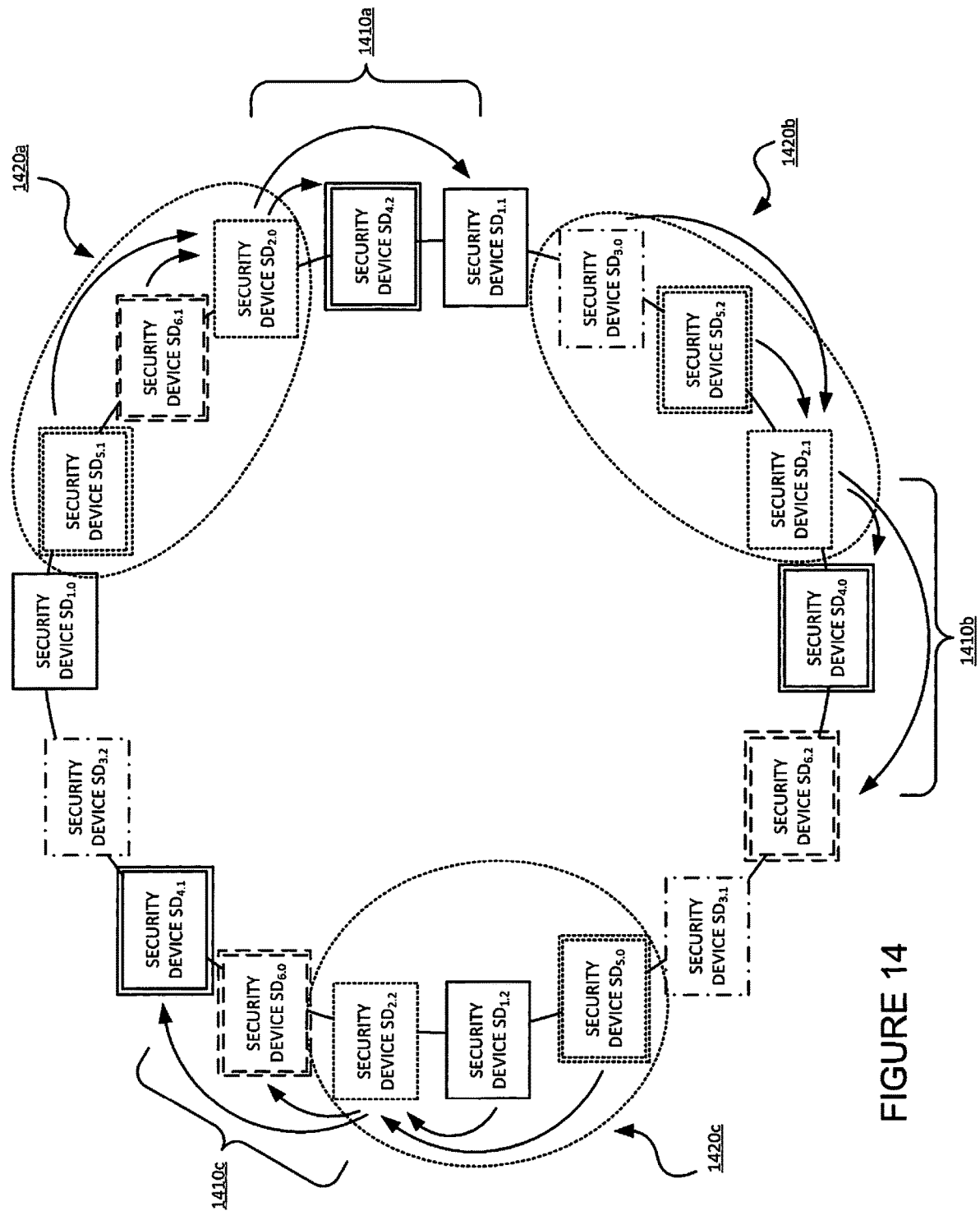
FIG. 14 illustrates the synchronization or sharing of flow state information among virtual security devices (associated with physical security devices) arranged on a consistent hash ring.

FIG. 14 illustrates how the ownership of a consistent hash ring is divided to six physical or real SDs ($SD_1$ through $SD_6$), each of which is mapped to three virtual nodes ($SD_1$ through $SD_{6,i}$, where i=0, 1, or 2), and also illustrates state synchronization among SDs. As an example, three dashed circles mark the portions of a consistent hash ring that can be owned by physical security device $SD_2$, which is mapped to three virtual security devices; namely $SD_{2,0}$, $SD_{2,1}$ and $SD_{2,2}$. Each of these virtual security devices (1) synchronizes its flow states to its two backup unique SDs and (2) receives flow states synchronized from two unique SDs who's virtual SDs are backed up by a virtual node of $SD_2$. More specifically, virtual security device $SD_{2,0}$ (which is mapped from physical security device $SD_2$) synchronizes its flow states to virtual security devices $SD_{4,2}$ and $SD_{1,1}$ 1410a, virtual security device $SD_{2,1}$ (which is mapped from physical security device $SD_2$) synchronizes its flow states to virtual security devices $SD_{4,0}$ and $SD_{6,2}$ 1410b, and virtual security device $SD_{2,2}$ (which is mapped from physical security device $SD_2$) synchronizes its flow states to virtual security devices $SD_{6,0}$ and $SD_{4,1}$ 1410c. Further, virtual security devices $SD_{5,1}$ and $SD_{6,1}$ synchronize their flow states to virtual security device $SD_{2,0}$ 1420a, virtual security devices $SD_{3,0}$ and $SD_{5,2}$ synchronize their flow states to virtual security device $SD_{2,1}$ 1420b, and virtual security devices $SD_{5,0}$ and $SD_{1,2}$ synchronize their flow states to virtual security device $SD_{2,2}$ 1420c.

§ 4.5.2 Example Ways of Sharing Packet Flow State Information

In some example embodiments consistent with the present description, synchronization of flow state among appropriate security devices can be done via known networking protocols such as, for example, back fiber, BGP peering, IP network, TCP (layer 2), UDP, etc. In other example embodiments, a proprietary protocol may be used to share such flow state information among appropriate security devices. In some example embodiments consistent with the present description, flow state information can be provided as a "data object" delivered from a "generator" to interested devices (or "peers" of the "generator"). For example, BGP can be used to find a path to a peer security device, and UDP can be used as the transport layer to carry the link state data objects. In some example embodiments consistent with the present description, a communication channel between peering security devices can be protected or secured by IPsec VPN tunnels so that link state data objects cannot be observed by outside devices.

Figure 11:
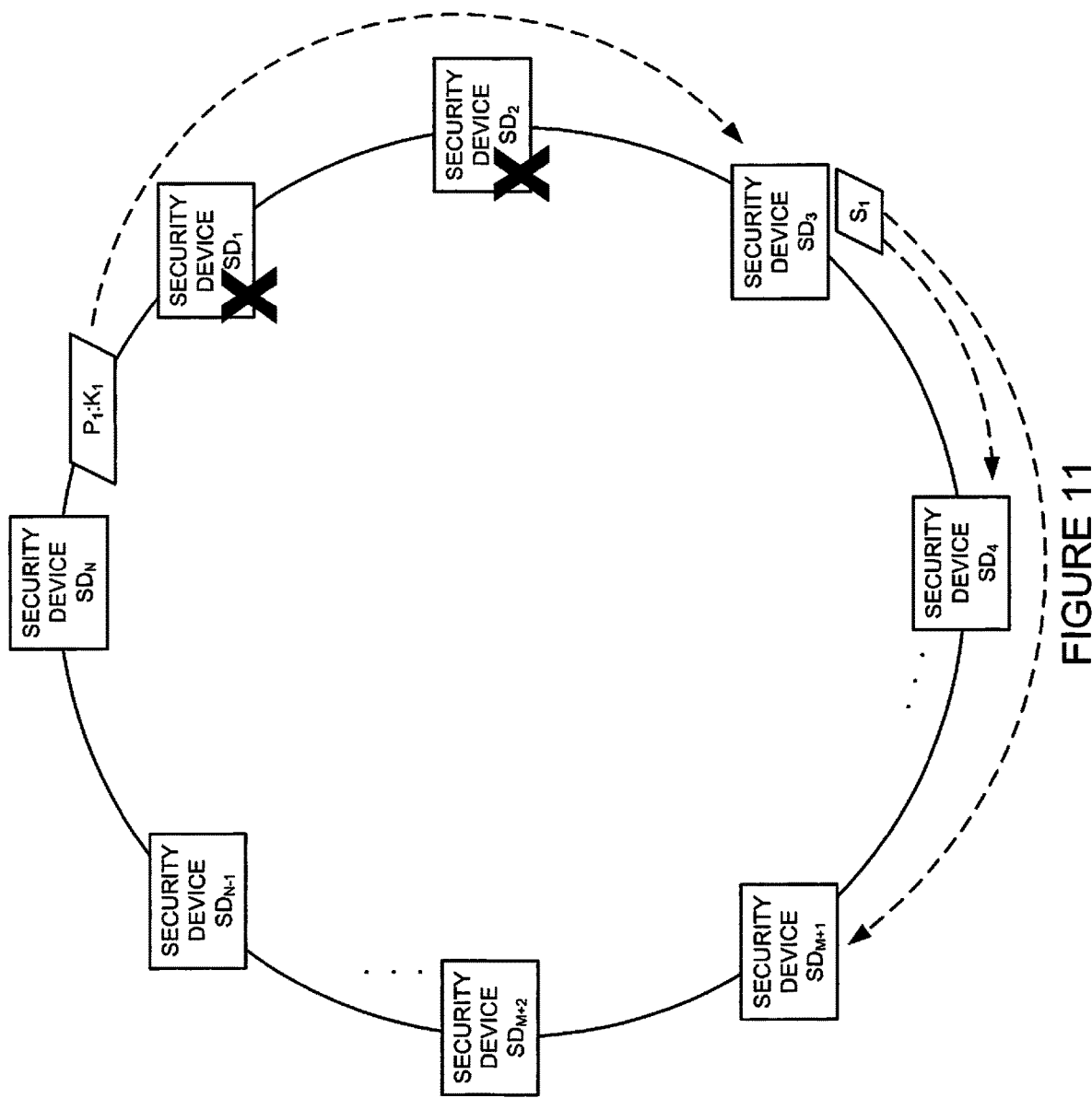
FIG. 11 illustrates flow state synchronization by a backup security device.

In some example embodiments consistent with the present description, when M is greater than one and a backup security device receives packets that are redirected by routers from a failed primary device, that backup security device synchronizes state(s) of flow(s) of these packets to the rest of the M backup security devices to which these flow(s) have been assigned. In this case, the backup security device can use the consistent hash ring algorithm, with assumption that no security device fails, to identify the primary security device and the M backup security devices for the packet flow(s). Then the backup security device synchronizes state(s) of these flow(s) only to the rest of identified M backup devices which work properly, for each given flow. For example, as illustrated in FIG. 11, packet flow $P_1$'s primary security device $SD_1$ and first backup security device $SD_2$ are both unavailable (e.g., both failed). Consequently, $P_1$'s second backup security device $SD_3$ now "possesses" or "owns" the packet flow $P_1$ and receives its packets from routers. Then, security device $SD_3$ synchronizes $P_1$'s flow state $S_1$ to $P_1$'s remaining backup devices $SD_4$ to $SD_{M+1}$.

§ 4.5.3 Example Ways of Determining Primary and Backup Security Devices as Next Hops In some example embodiments consistent with the present description, the hash function may be the same as that used in equal cost multi-path (ECMP) forwarding. ECMP is a network routing strategy that allows for traffic of the same session, or flow (that is, traffic with the same source and destination) to be transmitted across multiple paths of equal cost. It is a mechanism that allows one to load balance traffic and increase bandwidth by more fully utilizing otherwise unused bandwidth on links to the same destination.

When forwarding a packet, the routing technology decides which next-hop path to use. In making this decision, the device considers the packet header fields that identify a flow. When ECMP is used, next-hop paths of equal cost are identified based on routing metric calculations and hash algorithms. That is, routes of equal cost have the same preference and metric values, and the same cost to the network. The ECMP process identifies a set of routes, each of which is a legitimate equal cost next hop towards the destination. The routes that are identified are referred to as an ECMP set. Because it addresses only the next hop destination, ECMP can be used with most routing protocols. An equal-cost multipath (ECMP) set is formed when the routing table contains multiple next-hop addresses for the same destination with equal cost. (Routes of equal cost have the same preference and metric values.) If there is an ECMP set for the active route, a hash algorithm may be used to choose one of the next-hop addresses in the ECMP set to install in the forwarding table. Some router operating systems, such as Junos from Juniper Networks of Sunnyvale, Calif. for example, can be configured to install multiple next-hop entries in an ECMP set, in the forwarding table. On such Juniper Networks devices, (e.g., per-flow) load balancing can be performed to spread traffic across multiple paths between routing devices. On some Juniper Networks security devices, source and destination IP addresses and protocols are examined to determine individual traffic flows. Packets for the same flow are forwarded on the same interface; the interface does not change when there are additions or changes to the ECMP set. This is important for features such as source network address translation (NAT), where the translation is performed only during the first path of session establishment for IDP, application layer gateway (ALG), and route-based virtual private network (VPN) tunnels. If a packet arrives on a given interface in an ECMP set, the security device ensures that reverse traffic is forwarded through the same interface.

Further, on some security devices from Juniper Networks, the maximum number of next-hop addresses in an ECMP set that can be installed in the forwarding table is 16. If there are more than 16 next-hop addresses in an ECMP set, only the first 16 addresses are used. In a "chassis cluster" deployment, a "local" interface is an interface that is on the same node as the interface on which a packet arrives, and a "remote" interface is an interface that is on the other chassis cluster node. If an ECMP route has both local and remote interfaces in a chassis cluster, then the local interface is favored for the next hop.

If a next-hop address is no longer part of the ECMP set or if it is removed from the routing table because of a route change, a flow that uses the next hop is rerouted and the session is not affected. Rerouting of the flow also occurs if there is a configuration change that takes away the next-hop address or if an administrator takes down the next-hop interface without deleting it. If a next-hop address is removed from the routing table because the interface is deleted or the session is intentionally cleared, the session is terminated without being rerouted.

To configure ECMP flow-based forwarding on some security devices from Juniper Networks, a load-balancing routing policy is first defined by including one or more policy-statement configuration statements at the {edit policy-options} hierarchy level, with the action load-balance per-packet. Then apply the routing policy to routes exported from the routing table to the forwarding table. To do this, include the forwarding-table and export configuration statements at the {edit routing-options} hierarchy level.

ECMP for SRX Series devices and vSRX instances from Juniper Networks can be configured to implement per-flow load balancing to spread traffic across multiple paths between routing devices. Routes of equal cost have the same preference and metric values. These devices examine the source IP address, the destination IP address, and the protocol to determine individual traffic flows. Traffic with the same source IP address, destination IP address, and protocol number that is permitted by a security policy is forwarded to the same next hop. Junos OS on these Juniper devices uses the flow information in its hashing logic.

For Junos OS SRX Series devices and vSRX instances from Juniper Networks, an ECMP set is formed when the routing table contains multiple next-hop addresses for the same destination with equal cost. ECMP allows for multiple next-hop entries in an ECMP set to be installed in the forwarding table. Packets for the same flow are forwarded on the same interface; the interface does not change when there are additions or changes to the ECMP set.

If there is an ECMP set for the active route, Junos OS uses a hash algorithm to choose one of the next-hop addresses in the ECMP set to install in the forwarding table.

In some versions of Junos OS from Juniper Networks, if ECMP support is enabled for reverse traffic, the SRX Series device uses a hash algorithm to determine the interface to use for reverse traffic in a flow. This process is similar to asymmetric routing in which a packet traverses from a source to a destination in one path and takes a different path when it returns to the source. If this feature is not enabled, the SRX Series device selects a route in the ECMP set to the incoming interface for reverse traffic, which is the default behavior.

With some routers and security devices from Juniper Networks, the allow-reverse-ecmp configuration statement in the {edit security flow} hierarchy can be used to configure ECMP flow-based forwarding to use a hash algorithm in selecting a route in the ECMP set for reverse traffic transit. That is, if this function is enabled, rather than selecting a route to the incoming interface, the device uses a hash algorithm to select a route in the ECMP set for reverse traffic. If the ECMP flow-based policy is zone-based, ECMP reverse lookup support ensures that the egress interface used for reverse traffic is in the same zone as the ingress interface used for arriving traffic.

§ 4.6 EXAMPLE OPERATIONS OF EXAMPLE METHOD(S)

Figure 12:
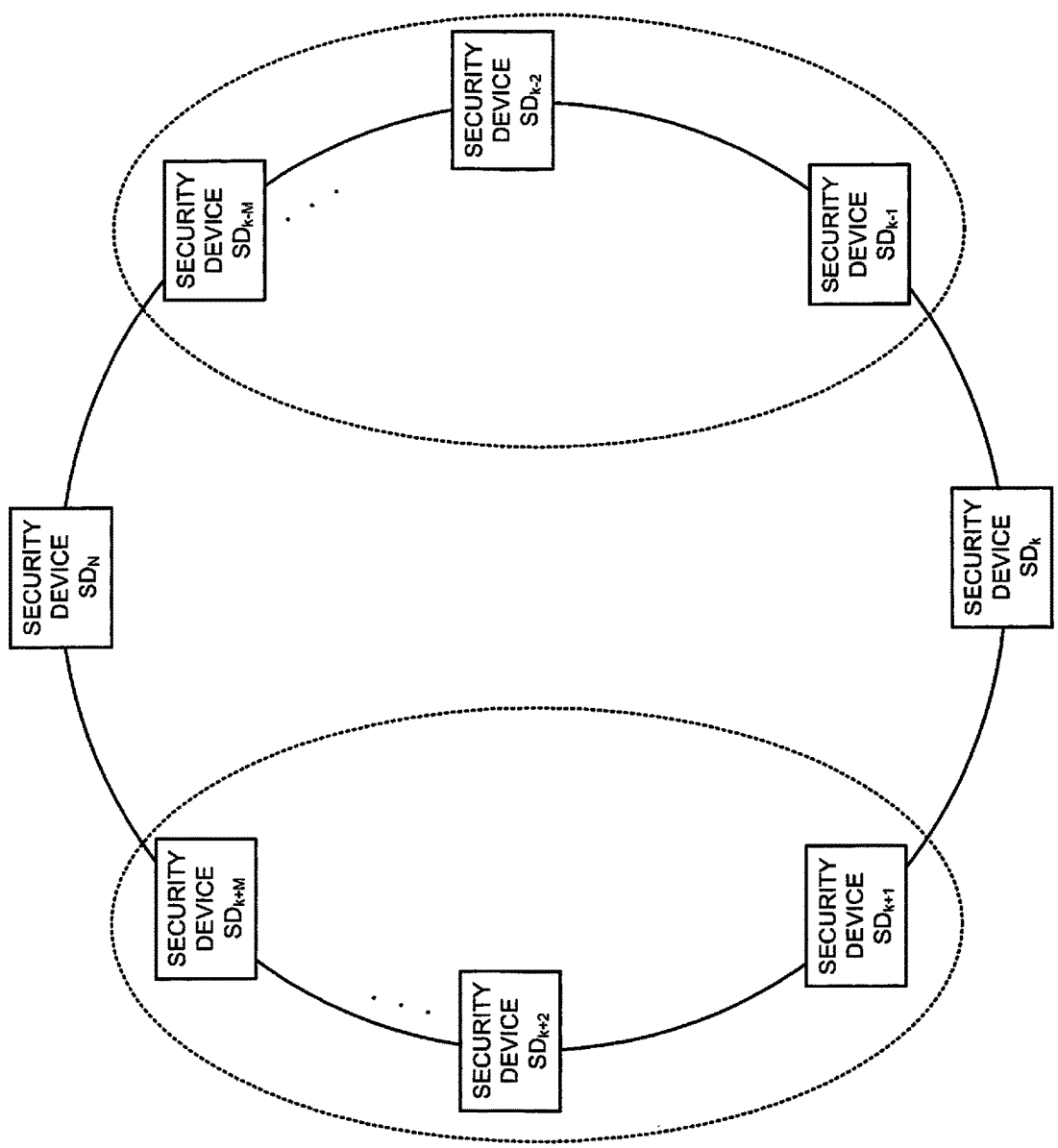
FIG. 12 illustrates the relationship between a recovered security device and its peer security devices.

When a security device recovers, it synchronizes flow state(s) from peer security devices and installs the flow state(s) in local memory before the recovered device is ready to receive and process packets from its neighbor routers. (Recall, e.g., the right-most branch of FIG. 4B.) Referring to FIG. 12, the recovered security device $SD_k$ will be the primary security device of the packets whose flows are "owned" by the recovered security device according to the consistent hash ring algorithm. (Recall, e.g., block 494 of FIG. 4B and see $SD_{k+1}$ to $SD_{k+M}$ relative to $SD_k$ in FIG. 12.) On the other hand, the recovered device $SD_k$ will back up M peer security devices ($SD_{k-M}$ to $SD_{k-1}$) that are located before itself on consistent hash ring in the clockwise direction. (Recall block 492 of FIG. 4B.)

As a result, the recovered device $SD_k$ synchronizes and installs (1) all flow states from the nearest working device among the M security devices ($SD_{k+1}$ to $SD_{k+M}$) located after recovered device $SD_k$, and (2) states of the flows, which are owned by any of the M security devices ($SD_{k-M}$ to $SD_{k-1}$) located before recovered security device $SD_k$ on consistent hash ring, from the nearest working one among those M security devices ($SD_{k-M}$ to $SD_{k-1}$), respectively. After a recovered device completes the above flow state synchronization, the device starts to receive and handle packets from upstream and/or downstream routers.

Figure 15:
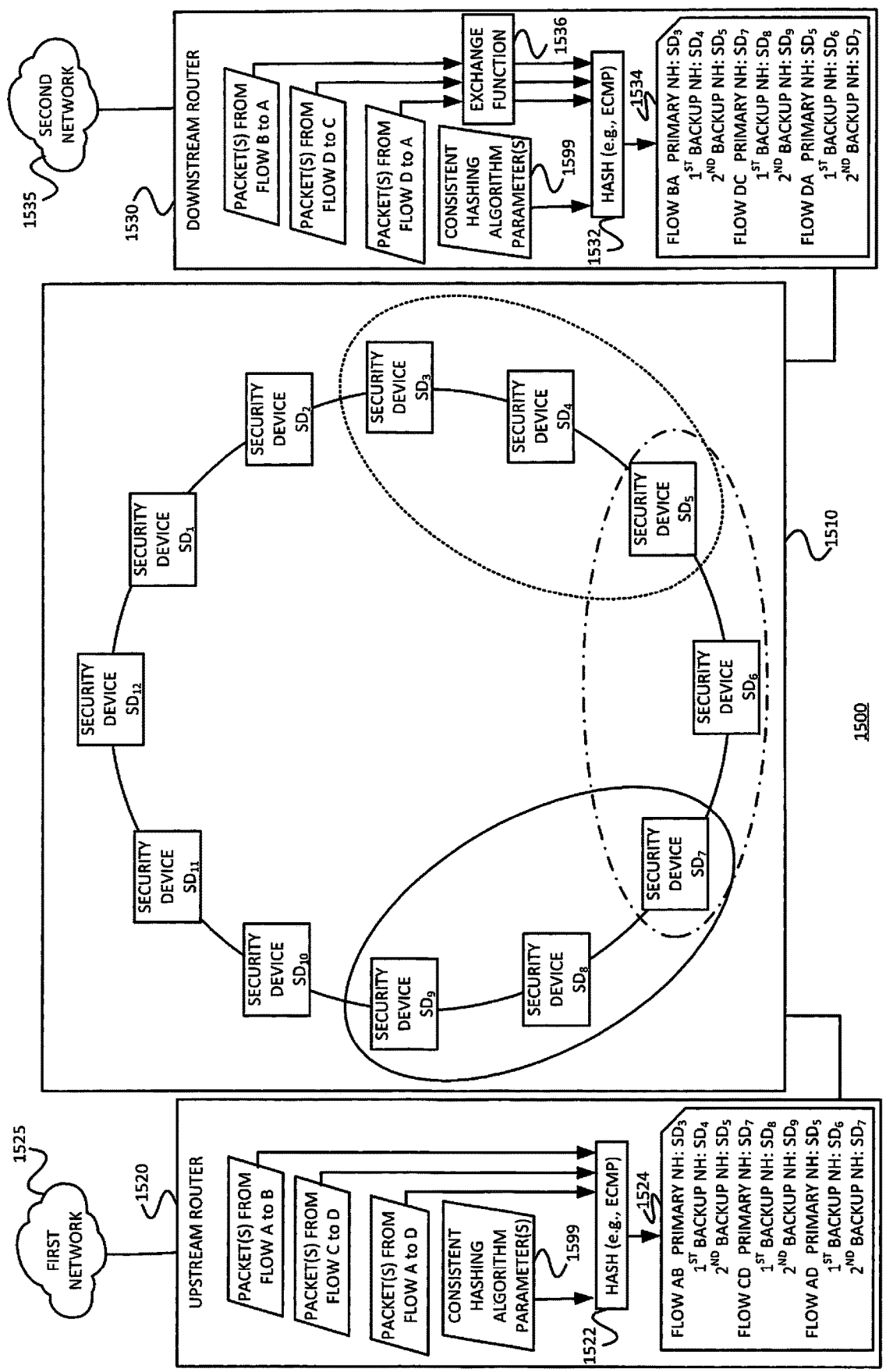
FIG. 15 illustrates operations by example upstream and downstream routers with respect to a pool of security devices.

FIG. 15 illustrates operations corresponding to the left branch of FIG. 4A by an upstream router 1520 and a downstream router 1530. In FIG. 15, network portion 1500 includes a pool or group of twelve security devices (SDs) 1510 arranged between the upstream router 1520 and the downstream router 1530. The upstream router 1520 is arranged between the security devices 1510 and a first network 1525 (such as the public network 125 of FIG. 1, for example). The downstream router 1530 is arranged between the security devices 1510 and a second network 1535 (such as the internal network 155 of FIG. 1, for example). The pool or group of SDs 1510 includes twelve SDs ($SD_1$-$SD_{12}$). Thus, N=12. Assume for this example that M=2.

Suppose that the upstream router 1520 receives packets from flow A to B (e.g., from IP source address A to IP destination address B)(referred to as flow AB). Information from the packet(s) header(s) is extracted and provided to a hash function (e.g., ECMP) 1522 that is configured with consistent hashing algorithm parameter(s) 1599. Assume that as a result of the hash, the upstream router 1520 installs forwarding information for flow AB in which the primary next hop is set to $SD_3$, a first backup next hop is $SD_4$, and the second backup next hop is $SD_5$. These three SDs are enclosed in a dotted oval.

Suppose further that the upstream router 1520 receives packets from flow C to D (e.g., from IP source address C to IP destination address D)(referred to as flow CD). Information from the packet(s) header(s) is extracted and provided to the hash function 1522 that is configured with consistent hashing algorithm parameter(s) 1599. Assume that as a result of the hash, the upstream router 1520 installs forwarding information for flow CD in which the primary next hop is set to $SD_7$, a first backup next hop is $SD_8$, and the second backup next hop is $SD_9$. These three SDs are enclosed in a solid oval.

Finally, suppose that the upstream router receives packets from flow A to D (e.g., from IP source address A to IP destination address D)(referred to as flow AD). Information from the packet(s) header(s) is extracted and provided to the hash function 1522 that is configured with consistent hashing algorithm parameter(s) 1599. Assume that as a result of the hash, the upstream router 1520 installs forwarding information for flow AD in which the primary next hop is set to $SD_5$, a first backup next hop is $SD_6$, and the second backup next hop is $SD_7$. These three SDs are enclosed in a dot-dashed oval.

Note that some SDs have different responsibilities for different flows. For example, $SD_5$ is the second backup next hop for flow AB, but is the primary next hop for flow AD. As another example, $SD_7$ is the primary next hop for flow CD, but is the second backup next hop for flow AD.

It is desired to have bidirectional flow state information tracked by appropriate ones of the SDs. To this end, referring to the downstream router 1530, an exchange function 1536 is used to switch the information extracted from the packet header(s), before the information is provided to the hash function 1532 that is configured with consistent hashing algorithm parameter(s) 1599. Suppose that the downstream router 1530 receives packets from flow B to A (e.g., from IP source address B to IP destination address A)(referred to as flow BA). Information from the packet(s) header(s) is extracted, exchanged, and provided to a hash function (e.g., ECMP) 1532 that is configured with consistent hashing algorithm parameter(s) 1599. Since the extracted header information from flow BA, after exchange, will be the same as that from flow AB, as a result of the hash, the downstream router 1530 installs forwarding information for flow BA in which the primary next hop is set to $SD_3$, a first backup next hop is $SD_4$, and the second backup next hop is $SD_5$. These three SDs are enclosed in a dotted oval. As this example illustrates, the same SDs have the same responsibilities for both upstream-to-downstream flow AB and downstream-to-upstream flow BA. This will allow the corresponding SDs to keep bidirectional flow state information.

Next, suppose that the downstream router 1530 receives packets from flow D to C (e.g., from IP source address D to IP destination address C)(referred to as flow DC). Information from the packet(s) header(s) is extracted, exchanged, and provided to the hash function 1532 that is configured with the consistent hashing algorithm parameter(s) 1599. Since the extracted header information from flow DC, after exchange, will be the same as that from flow CD, as a result of the hash, the downstream router 1530 installs forwarding information for flow DC in which the primary next hop is set to $SD_7$, a first backup next hop is $SD_8$, and the second backup next hop is $SD_9$. These three SDs are enclosed in a solid oval. As this example illustrates, the same SDs have the same responsibilities for both upstream-to-downstream flow CD and downstream-to-upstream flow DC. This will allow the corresponding SDs to keep bidirectional flow state information.

Finally, suppose that the downstream router 1530 receives packets from flow D to A (e.g., from IP source address D to IP destination address A)(referred to as flow DA). Information from the packet(s) header(s) is extracted, exchanged, and provided to the hash function 1532 that is configured with the consistent hashing algorithm parameter(s) 1599. Since the extracted header information from flow DA, after exchange, will be the same as that from flow AD, as a result of the hash, the downstream router 1530 installs forwarding information for flow DA in which the primary next hop is set to $SD_5$, a first backup next hop is $SD_6$, and the second backup next hop is $SD_7$. These three SDs are enclosed in a dotted oval. As this example illustrates, the same SDs have the same responsibilities for both upstream-to-downstream flow AD and downstream-to-upstream flow DA. This will allow the corresponding SDs to keep bidirectional flow state information.

§ 4.7 CONCLUSIONS

With example embodiments consistent with the present description, a large group of security devices can collaborate and align with neighbor routers efficiently through a shared consistent hash algorithm in determining the subset of all security devices that will receive packets of any given flow from neighbor routers. Given this determination, the flow's state is synchronized among (and preferably only among) the security devices within this subset instead of among all of the security devices. Consequently, such example embodiments address one or more of the unmet needs discussed in the background. Such example embodiments can be used to provide an efficient, practical and scalable approach to facilitating many security devices collaborating with neighbor routers to achieve high resiliency, availability, and performance of network security service.

What is claimed is:

1. A system comprising:
   a) at least one upstream router;
   b) at least one downstream router; and
   c) a first plurality (N) of security devices arranged between the at least one upstream router and the at least one downstream router, each of the first plurality of security devices providing bidirectional security services for a plurality of bidirectional flows between the at least one upstream router and the at least one downstream router, wherein a consistent hash ring algorithm for generating a consistent hash ring is used to assign each of the plurality of bidirectional flows to (1) a primary one of the first plurality of security devices, and (2) a set (M) of one or more of the first plurality of security devices serving as backup security device(s), wherein M+1 is less than N, and wherein, for each of the plurality of bidirectional flows, the primary one of the first plurality of security devices and set of M backup security device(s) synchronize bidirectional flow state information with one another, but do not synchronize the bidirectional flow state information with all of the N security devices.

2. The system of claim 1 wherein, for each of the plurality of bidirectional flows, the primary one of the first plurality of security devices and set of M backup security device(s) synchronize the bidirectional flow state information only with one another, but not with any other one of the N security devices.

3. The system of claim 1, wherein for each of the plurality of bidirectional flows, the M backup security device(s) are the M next unique security device(s) following the primary security device on the consistent hash ring.

4. The system of claim 3, wherein for each of the plurality of bidirectional flows, the M backup security device(s) are the M next unique security device(s) following the primary security device on the consistent hash ring in a clockwise direction.

5. The system of claim 1, wherein upon failure of a primary security device assigned to a given bidirectional flow, the at least one upstream router and the at least one downstream router forward any packets belonging to the given bidirectional flow to a next available one of the M backup security device(s) assigned to the given bidirectional flow on the consistent hash ring.

6. The system of claim 5, wherein, upon recovery of the primary security device assigned to the given bidirectional flow, responsive to the recovery, the at least one upstream router and the at least one downstream router forward any packets belonging to the given bidirectional flow to the primary security device assigned to the given bidirectional flow.

7. The system of claim 1, wherein M is more than 1, and
wherein upon failure of both (1) a primary security device assigned to a given bidirectional flow and (2) a next one of the M backup security device(s) on the consistent hash ring assigned to the given bidirectional flow, the at least one upstream router and the at least one downstream router forward any packets belonging to the given bidirectional flow to a next available one of the M backup security device(s) assigned to the given bidirectional flow on the consistent hash ring.

8. A security system for use between at least one upstream router and at least one downstream router, the security system comprising:
a first plurality (N) of security devices arranged between the at least one upstream router and the at least one downstream router, each of the first plurality of security devices being configured to provide bidirectional security services for a plurality of bidirectional flows between the at least one upstream router and the at least one downstream router,
wherein, for each of the plurality of bidirectional flows, (1) one of the first plurality of security devices is assigned, as a primary security device to the bidirectional flow, using a consistent hash ring algorithm for generating a consistent hash ring, and (2) a set (M) of one or more of the first plurality of security devices is assigned, as backup security device(s) to the bidirectional flow, using the consistent hash ring algorithm, wherein M+1 is less than N, each of the first plurality of security devices being configured with a state synchronization process in which, for each of the plurality of bidirectional flows, the primary security device assigned to the bidirectional flow and set of M backup security device(s) assigned to the bidirectional flow, synchronize bidirectional flow state information with one another, but do not synchronize bidirectional flow state information with all of the N security devices.

9. The security system of claim 8 wherein, for each of the plurality of flows, the primary security device assigned to the bidirectional flow and set of M backup security device(s) assigned to the bidirectional flow, synchronize the bidirectional flow state information only with one another, but not with any other one of the N security devices.

10. The security system of claim 8, wherein for each of the plurality of bidirectional flows, the M backup security device(s) assigned to the bidirectional flow are the M next unique security device(s) following, on the consistent hash ring, the primary security device assigned to the bidirectional flow.

11. The security system of claim 10, wherein for each of the plurality of bidirectional flows, the M backup security device(s) assigned to the bidirectional flow are the M next unique security device(s) following, in a clockwise direction on the consistent hash ring, the primary security device assigned to the bidirectional flow.

12. The security system of claim 8, wherein upon failure of a primary security device assigned to a given bidirectional flow, the at least one upstream router and the at least one downstream router forward any packets belonging to the given bidirectional flow to a next available one of the M backup security device(s) assigned to the given bidirectional flow on the consistent hash ring.

13. The security system of claim 12, wherein, upon recovery of the primary security device assigned to the given bidirectional flow, responsive to the recovery, the at least one upstream router and the at least one downstream router forward any packets belonging to the given bidirectional flow to the primary security device assigned to the given bidirectional flow.

14. The security system of claim 8, wherein M is more than 1, and
wherein upon failure of both (1) a primary security device assigned to a given bidirectional flow and (2) a next one of the M backup security device(s) on the consistent hash ring assigned to the given bidirectional flow, the at least one upstream router and the at least one downstream router forward any packets belonging to the given bidirectional flow to a next available one of the M backup security device(s) assigned to the given bidirectional flow on the consistent hash ring.

15. A computer-implemented method for use in a system having (1) at least one upstream router, (2) at least one downstream router, and (3) a first plurality (N) of security devices arranged between the at least one upstream router and the at least one downstream router, each of the first plurality of security devices being configured to provide bidirectional security services for packets received from the at least one upstream router and for packets received from the at least one downstream router, the computer-implemented method comprising:

a) assigning, using a consistent hash ring algorithm for generating a consistent hash ring, for each of a plurality of bidirectional flows,
   (1) one of the first plurality of security devices as a primary security device to the bidirectional flow, and
   (2) a set (M) of one or more of the first plurality of security devices as backup security device(s) to the bidirectional flow,
   wherein M+1 is less than N;
b) receiving, from either (A) one of the at least one upstream router, or (B) one of the at least one downstream router, a packet belonging to a given bidirectional flow;
c) responsive to receiving the packet,
   1) creating or updating a state of the given bidirectional flow to which the received packet belongs, and
   2) storing the state of the given bidirectional flow; and
d) synchronizing the stored state of the given bidirectional flow among the primary security device assigned to the given bidirectional flow and the set of M backup security device(s) assigned to the given bidirectional flow, but not with all of the N security devices.

16. The computer-implemented method of claim 15 wherein the act of synchronizing the stored state of the given bidirectional flow among with the primary security device assigned to the given bidirectional flow and the set of M backup security device(s) assigned to the given bidirectional flow, but not with all of the N security devices, synchronizes the stored state of the given bidirectional flow among only the primary security device assigned to the given bidirectional flow and the set of M backup security device(s) assigned to the given bidirectional flow.

17. The computer-implemented method of claim 15, wherein the M backup security device(s) assigned to the given bidirectional flow are the M next unique security device(s) following, on the consistent hash ring, the primary security device assigned to the given bidirectional flow.

18. The computer-implemented method of claim 17, wherein the M backup security device(s) assigned to the given bidirectional flow are the M next unique security device(s) following, in a clockwise direction on the consistent hash ring, the primary security device assigned to the given bidirectional flow.

19. The computer-implemented method of claim 15, further comprising:
   e) finding, using the consistent hash ring algorithm, both (1) a first set of M different security devices before the one security device on the consistent hash ring, and (2) a second set of M different security devices after the one security device on the consistent hash ring;
   f) responsive to one of the plurality of N security devices being brought into an available state,
      1) synchronizing, with the one security device, state information of any of the plurality of bidirectional flows to which each of the first set of M security devices was assigned as a primary security device, and
      2) synchronizing, with a nearest one of the second set of M security devices in an UP state, state information of any of the plurality of bidirectional flows to which the one security device was assigned as a primary security device.

20. The computer-implemented method of claim 15, further comprising:
   e) receiving a new packet by one of the at least one upstream routers or one of the at least one downstream routers;
   f) determining a bidirectional flow to which the new packet belongs;
   g) determining one of the plurality of N security devices to which the determined bidirectional flow was assigned as a primary security device;
   h) determining whether or not the primary security device is available;
   i) responsive to determining that the primary security device is not available,
      1) determining a next available one of plurality of N security devices on the consistent hash ring, and
      2) forwarding the received new packet to the determined next available one of the plurality of N security devices on the consistent hash ring.

* * * * *